(12) United States Patent
Lee et al.

(10) Patent No.: US 12,013,786 B2
(45) Date of Patent: Jun. 18, 2024

(54) MULTI-PORT QUEUEING CACHE AND DATA PROCESSING SYSTEM INCLUDING THE SAME

(71) Applicant: SAMSUNG ELECTRONICS CO., LTD., Suwon-si (KR)

(72) Inventors: Heonsoo Lee, Suwon-si (KR); Byungchul Hong, Suwon-si (KR); Junseok Park, Suwon-si (KR); Jaehun Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/072,929

(22) Filed: Dec. 1, 2022

(65) Prior Publication Data

US 2023/0195636 A1  Jun. 22, 2023

(30) Foreign Application Priority Data

Dec. 22, 2021 (KR) .......... 10-2021-0185205
May 20, 2022 (KR) .......... 10-2022-0062093

(51) Int. Cl.
*G06F 12/0862* (2016.01)
*G06F 9/38* (2018.01)
*G06F 12/02* (2006.01)
*G06F 12/06* (2006.01)

(52) U.S. Cl.
CPC ........ *G06F 12/0862* (2013.01); *G06F 9/3816* (2013.01); *G06F 12/0261* (2013.01); *G06F 12/0646* (2013.01)

(58) Field of Classification Search
CPC ............ G06F 12/0862; G06F 12/0261; G06F 12/0646; G06F 9/3816
See application file for complete search history.

(56) References Cited

U.S. PATENT DOCUMENTS

| | | | |
|---|---|---|---|
| 5,247,649 A * | 9/1993 | Bandoh | G06F 12/0853 711/131 |
| 6,654,854 B1 | 11/2003 | Janakiraman et al. | |
| 6,671,196 B2 | 12/2003 | Civlin | |
| 7,047,284 B1 * | 5/2006 | Agarwala | G06F 13/37 370/231 |
| 7,246,203 B2 | 7/2007 | Moat et al. | |
| 7,917,701 B2 | 3/2011 | Charra et al. | |
| 8,255,632 B2 | 8/2012 | Shirahige et al. | |
| 8,392,657 B2 | 3/2013 | Zhao et al. | |
| 11,126,555 B2 | 9/2021 | Lee et al. | |

* cited by examiner

*Primary Examiner* — Baboucarr Faal
(74) *Attorney, Agent, or Firm* — Sughrue Mion, PLLC

(57) ABSTRACT

In some embodiments, a multi-port queueing cache includes a plurality of first ports, a plurality of second ports, a plurality of request handlers respectively coupled to the plurality of first ports, a cache storage unit coupled to the plurality of second ports, a reserve interface configured to exchange at least one address and at least one reserved cache line number, and a request interface configured to exchange the at least one reserved cache line number and at least one data. The reserve interface and the request interface are disposed between the plurality of request handlers and the cache storage unit. The cache storage unit includes a plurality of cache lines configured to store the plurality of data. The cache storage unit is configured to output a portion of the plurality of addresses, and receive a portion of the plurality of data corresponding to the portion of the plurality of addresses.

20 Claims, 21 Drawing Sheets

520a

MULTI-PORT QUEUEING CACHE AND DATA PROCESSING SYSTEM INCLUDING THE SAME

CROSS-REFERENCE TO RELATED APPLICATIONS

This application claims benefit of priority under 35 U.S.C. § 119 to Korean Patent Application No. 10-2021-0185205, filed on Dec. 22, 2021, and to Korean Patent Application No. 10-2022-0062093, filed on May 20, 2022, in the Korean Intellectual Property Office, the disclosures of which are incorporated by reference herein in their entireties.

BACKGROUND

1. Field

The present disclosure relates to semiconductor integrated circuits, and in particular, to multi-port queueing caches and data processing systems including multi-port queueing caches.

2. Description of Related Art

Related data processing systems may mitigate the effects of memory access latencies by moving elements of data into a local, high-speed memory known as a cache. For example, the data are moved, or prefetched, into the cache before they are needed so that they are readily available when requested.

When general calculations and/or computations are performed, data may not be arranged in a predictable order, and the order of memory accesses may not be recognized in advance. Therefore, to increase the cache efficiency, the prediction may be performed based on statistical information, and the data obtained based on the prediction may be stored in the cache. However, since the size of the cache is limited, the cache efficiency may decrease if the prediction has failed or if data has been stored in the cache too early.

In contrast, when massive calculations and/or computations (e.g., matrix calculations) are performed, data may be arranged in a predictable order, and memory may be accessed in a predetermined order. Therefore, the data may be stored in the cache and the stored data may be used when it is needed, the data may be removed from the cache when it is no longer needed, and thus an efficient cache may be implemented. Various methods for the efficient cache have been researched.

SUMMARY

The present disclosure provides a multi-port queueing cache capable of having relatively large capacity and high performance with a relatively simple structure and interface.

The present disclosure provides a data processing system including the multi-port queueing cache.

According to an aspect of the present disclosure, a multi-port queueing cache includes a plurality of first ports, a plurality of second ports, a plurality of request handlers, a cache storage, a reserve interface, and a request interface. The plurality of request handlers are respectively coupled to the plurality of first ports. The plurality of request handlers are configured to receive a plurality of addresses through the plurality of first ports, and to output a plurality of data corresponding to the plurality of addresses through the plurality of first ports. The cache storage is coupled to the plurality of second ports. The cache storage includes a plurality of cache lines configured to store the plurality of data. The cache storage is configured to output at least a portion of the plurality of addresses through the plurality of second ports, and to receive at least a portion of the plurality of data corresponding to the at least portion of the plurality of addresses through the plurality of second ports. The reserve interface is configured to exchange at least one address and at least one reserved cache line number. The request interface configured to exchange the at least one reserved cache line number and at least one data. The reserve interface and the request interface are disposed between each of the plurality of request handlers and the cache storage.

According to an aspect of the present disclosure, a data processing system includes a data processing device, a memory device configured to store a plurality of data used for calculations performed by the data processing device, and a first multi-port queueing cache between the data processing device and the memory device. The first multi-port queueing cache includes a plurality of first ports, a plurality of second ports, a plurality of first request handlers, a first cache storage, a first reserve interface, and a first request interface. The plurality of first request handlers are configured to receive a plurality of first addresses through the plurality of first ports, and to output a plurality of first data corresponding to the plurality of first addresses through the plurality of first ports. The first cache storage includes a plurality of first cache lines configured to store the plurality of first data. The first cache storage is configured to output at least a portion of the plurality of first addresses through the plurality of second ports, and to receive at least a portion of the plurality of first data corresponding to the at least portion of the plurality of first addresses through the plurality of second ports. The first reserve interface is configured to exchange at least one address and at least one reserved cache line number. The first request interface configured to exchange the at least one reserved cache line number and at least one data. The first reserve interface and the first request interface are disposed between each of the plurality of first request handlers and the first cache storage.

According to an aspect of the present disclosure, a multi-port queueing cache includes a plurality of first ports, a plurality of request handlers, a plurality of second ports, a plurality of cache banks, a reserve bus, and a request bus. The plurality of request handlers are respectively coupled to the plurality of first ports. The plurality of request handlers are configured to receive a plurality of addresses from a data processing device through the plurality of first ports, and to output a plurality of data corresponding to the plurality of addresses to the data processing device through the plurality of first ports. Each of the plurality of request handlers include a first reserve port and a first request port. The data processing device is disposed outside the multi-port queueing cache. The plurality of cache banks are respectively coupled to the plurality of second ports. The plurality of cache banks include a plurality of cache lines configured to store the plurality of data. The plurality of cache banks are configured to output at least some of the plurality of addresses to a memory device through the plurality of second ports, and to receive at least some of the plurality of data corresponding to the at least some of the plurality of addresses from the memory device through the plurality of second ports. Each of the plurality of cache banks include a second reserve port and a second request port. The memory device are disposed outside the multi-port queueing cache. The reserve bus is coupled to the first reserve port in each of the plurality of request handlers and the second reserve port in each of the plurality of cache banks. The request bus is coupled to the first request port in each of the plurality of request handlers and the second request port in each of the plurality of cache banks. A first reserve interface and a first request interface are disposed between a first request handler of the plurality of request handlers and a first cache bank of the plurality of cache banks. The first reserve interface includes the first reserve port, the second reserve port, and the reserve bus. The first request interface includes the first request port, the second request port, and the request bus. The first request handler is configured to sequentially receive first to N-th addresses from the data processing device through a corresponding first port of the plurality of first ports, and to sequentially transfer the first to N-th addresses to the first cache bank through the first reserve interface. N is an integer greater than one. In response to first data corresponding to the first address being not stored in the first cache bank, the first cache bank is configured to allocate the first address to a first cache line, to output the first address to the memory device through a corresponding second port of the plurality of second ports, to transfer a cache line number of the first cache line to the first request handler through the first reserve interface, to receive the first data from the memory device through the second port, and to store the first data into the first cache line. The first request handler is configured to transfer the cache line number of the first cache line to the first cache bank through the first request interface. The first cache bank is configured to transfer the first data to the first request handler through the first request interface. The first request handler is configured to output the first data to the data processing device through the first port.

BRIEF DESCRIPTION OF DRAWINGS

Illustrative, non-limiting example embodiments will be more clearly understood from the following detailed description taken in conjunction with the accompanying drawings.

DETAILED DESCRIPTION OF EMBODIMENTS

Figure 1:
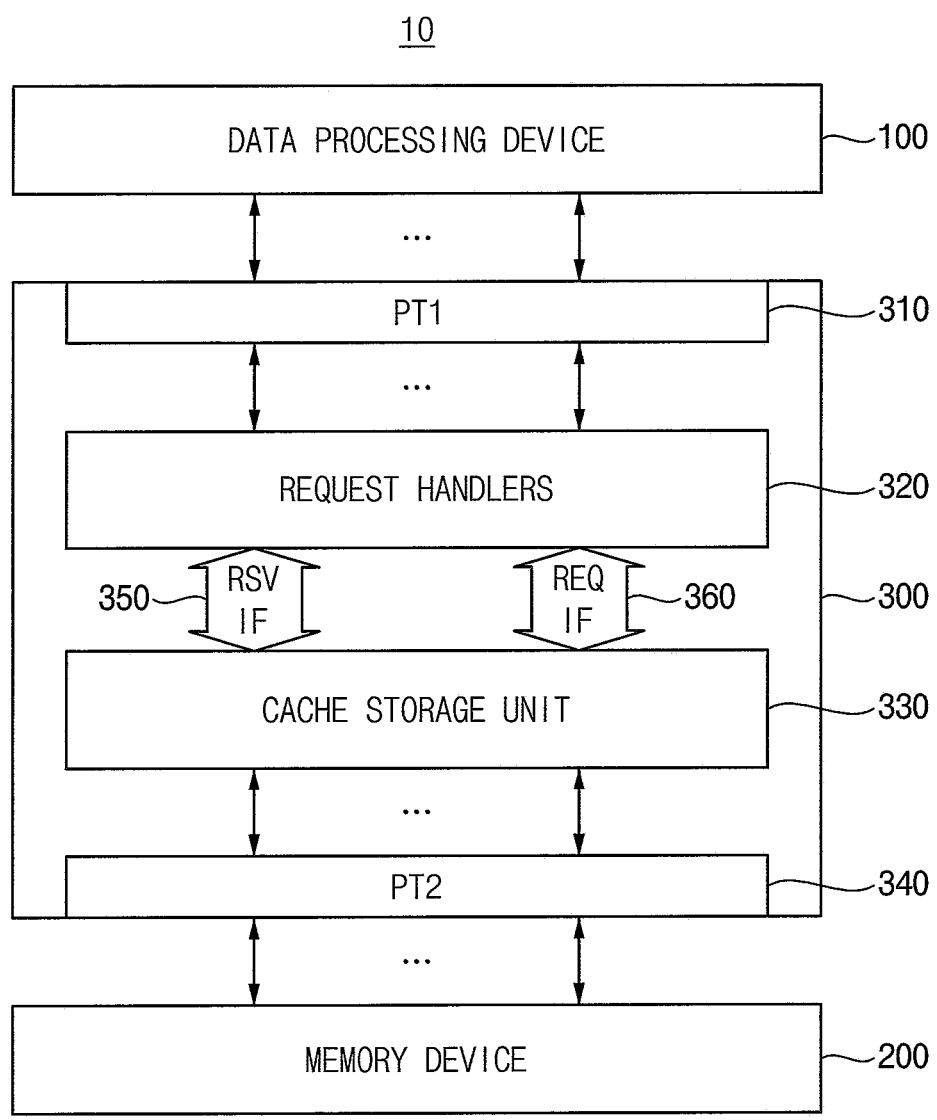
FIG. 1 is a block diagram illustrating a multi-port queueing cache and a data processing system including the multi-port queueing cache according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification disclosure. In the flowcharts described with reference to the drawings in this specification disclosure, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may be only used to differentiate one component from others.

It will be understood that, although the terms first, second, third, fourth, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The term "coupled" (or connected) as used throughout the specification of this disclosure (including claims of the present disclosure) may refer to any direct or indirect means of connection. For example, if it is described in the text that a first device is coupled (or connected) to a second device, it should be interpreted that the first device can be directly connected to the second device, or the first device can be indirectly connected to the second device through another device or some other connection means. Terms such as "first" and "second" mentioned in the full text of the description (including claims of the present disclosure) are used to name the elements or to distinguish different embodiments or scopes, rather than to limit the upper or lower limit of the number of elements, nor is it intended to limit the order of the elements. Also, where possible, elements/components/steps denoted by the same reference numerals in the drawings and embodiments represent the same or similar parts. Elements/components/steps that are denoted by the same reference numerals or the same terminology in different embodiments may serve as cross reference for each other.

Hereinafter, one or more embodiments of the present disclosure are described in detail with reference to the accompanying drawings.

FIG. 1 is a block diagram illustrating a multi-port queueing cache and a data processing system including the multi-port queueing cache according to example embodiments.

Referring to FIG. 1, a data processing system 10 includes a data processing device 100, a memory device 200 and a multi-port queueing cache 300.

The data processing device 100 controls operations of the data processing system 10, and performs various calculations, computations and/or functions using data. For example, the data processing device 100 may be a neural processing unit (NPU), a graphic processing unit (GPU) or a digital signal processor (DSP), and may perform massive calculations and/or computations (e.g., matrix calculations or convolution calculations). However, example embodiments are not limited thereto, and the data processing device 100 may be implemented in various forms for performing the above-described calculations.

The memory device 200 stores the data that are used or are necessary for the calculations performed and/or processed by the data processing device 100. For example, the memory device 200 may be a dynamic random access memory (DRAM). However, example embodiments are not limited thereto, and the memory device 200 may include at least one of various volatile memories and/or various non-volatile memories.

The multi-port queueing cache 300 is disposed or located between the data processing device 100 and the memory device 200. The multi-port queueing cache 300 may store some of the data stored in the memory device 200. For example, among the data stored in the memory device 200, data that is relatively frequently accessed or has relatively large number of times the data is accessed may be stored in the multi-port queueing cache 300. Thus, the time required to read the data may be reduced.

The multi-port queueing cache 300 includes a plurality of first ports (PT1) 310, a plurality of request handlers 320, a cache storage 330, a plurality of second ports (PT2) 340, a reserve interface (RSV IF) 350 and a request interface (REQ IF) 360.

The plurality of first ports 310 are connected to the data processing device 100, and the plurality of second ports 340 are connected to the memory device 200.

The plurality of request handlers 320 are connected to the plurality of first ports 310, respectively. The plurality of request handlers 320 receives a plurality of addresses from the data processing device 100 through the plurality of first ports 310, and outputs a plurality of data corresponding to the plurality of addresses to the data processing device 100 through the plurality of first ports 310. The plurality of request handlers 320 may serve to process and/or manage data requests that are received from the data processing device 100 through the plurality of first ports 310.

The cache storage 330 is connected to the plurality of second ports 340. The cache storage 330 outputs at least some of the plurality of addresses to the memory device 200 through the plurality of second ports 340, and receives at least some of the plurality of data corresponding to the at least some of the plurality of addresses from the memory device 200 through the plurality of second ports 340. As described with reference to FIG. 3, the cache storage 330 includes a plurality of cache lines that store the plurality of data or a part of the plurality of data. The cache storage 330 may serve to store the data that is relatively frequently accessed by the data processing device 100 among the data stored in the memory device 200. The cache storage 330 may receive the data from the memory device 200 through the plurality of second ports 340 and may store the data that is received from the memory device 200.

In some example embodiments, as described with reference to FIG. 2, the cache storage 330 may include a plurality of cache banks that are connected to the plurality of second ports 340, respectively. In other example embodiments, as described with reference to FIG. 15, the cache storage 330 may include a cache register file (not shown) that is connected to the plurality of second ports 340.

The reserve interface 350 and the request interface 360 may be formed or provided between each of the plurality of request handlers 320 and the cache storage 330. Each of the plurality of request handlers 320 and the cache storage 330 exchange at least one address and at least one reserved cache line number through the reserve interface 350. Each of the plurality of request handlers 320 and the cache storage 330 exchange the at least one reserved cache line number and at least one data through the request interface 360.

A detailed signal/data transmission process using the reserve interface 350 and the request interface 360 is described with reference to FIGS. 6 through 12.

When massive calculations and/or computations (e.g., matrix calculations or convolution calculations) are performed, data processed by the data processing device 100 may be arranged in a predictable order, and the data may be read from the memory device 200 in a predetermined order (e.g., a deterministic sequence). Therefore, the data may be stored in the cache and the stored data may be used when it is needed, and the data may be removed from the cache when it is no longer needed, and thus the efficient cache may be implemented. For example, the above-described cache may be implemented based on a queueing cache.

In the multi-port queueing cache 300 according to example embodiments, the queueing cache may be implemented with a multi-port structure for relatively large capacity and high performance, and thus a multi-access by the data processing device 100 may be implemented. For example, the multi-port queueing cache 300 may be connected to the data processing device 100 through the plurality of first ports 310, may be connected to the memory device 200 through the plurality of second ports 340, and may include the plurality of request handlers 320 connected to the plurality of first ports 310 and the cache storage 330 connected to the plurality of second ports 340. Additionally or alternatively, the reserve interface 350 and the request interface 360 may be formed between each of the plurality of request handlers 320 and the cache storage 330. Accordingly, a plurality of data requests that are received from the data processing device 100 through the plurality of first ports 310 may be individually and/or independently processed (or handled), and thus the efficient and optimized data reading and processing operations may be implemented.

Figure 2:
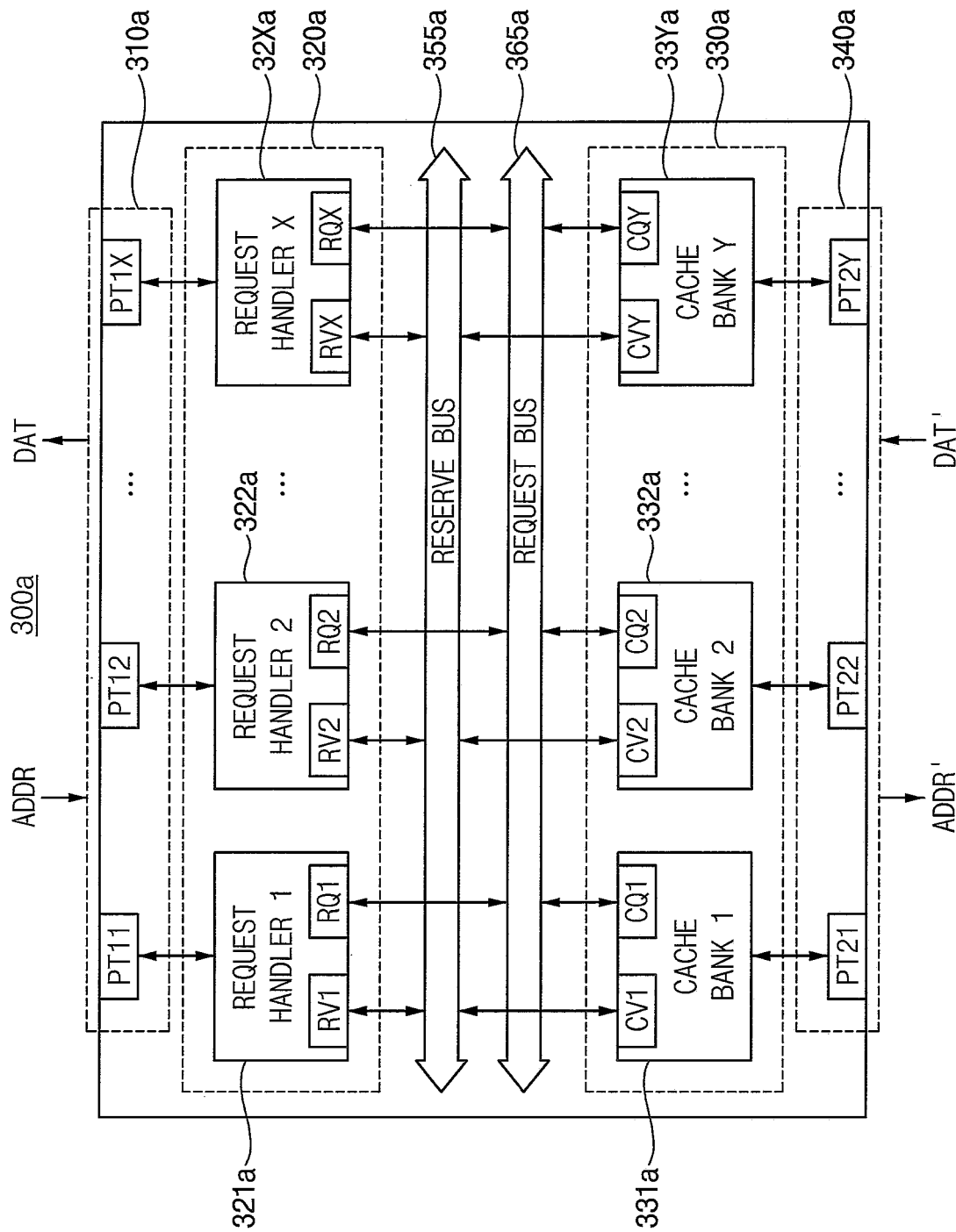
FIG. 2 is a block diagram illustrating an example of a multi-port queueing cache according to example embodiments.

FIG. 2 is a block diagram illustrating an example of a multi-port queueing cache according to example embodiments.

Referring to FIG. 2, a multi-port queueing cache 300a may include a plurality of first ports 310a, a plurality of request handlers 320a, a cache storage 330a and a plurality of second ports 340a. The multi-port queueing cache 300a may further include a reserve bus 355a and a request bus 365a. The multi-port queueing cache 300a may include or may be similar in many respects to the multi-port queueing cache 300 described above in reference to FIG. 1 and may include additional features not described above.

The plurality of first ports 310a may receive a plurality of addresses ADDR from a data processing device (e.g., the data processing device 100 in FIG. 1), and may output a plurality of data DAT corresponding to the plurality of addresses ADDR to the data processing device. For example, the plurality of first ports 310a may include X first ports PT11, PT12, . . . , PT1X, where X is an integer greater than one. That is, the number (or quantity) of the plurality of first ports 310a may be X.

The plurality of second ports 340a may output at least some addresses ADDR' among the plurality of addresses ADDR to a memory device (e.g., the memory device 200 in FIG. 1), and may receive at least some data DAT' corresponding to the at least some addresses ADDR' among the plurality of data DAT from the memory device. For example, the plurality of second ports 340a may include Y second ports PT21, PT22, . . . , PT2Y, where Y is an integer greater than one. That is, the number (or quantity) of the plurality of second ports 340a may be X.

In some example embodiments, each of the plurality of first ports 310a and each of the plurality of second ports 340a may include at least one input/output (I/O) pin. For example, a pin may be a contact pad or a contact pin, but example embodiments are not limited thereto.

In some example embodiments, the number (e.g., X) of the plurality of first ports 310a and the number (e.g., Y) of the plurality of second ports 340a may be different from each other. In other example embodiments, the number of the plurality of first ports 310a and the number of the plurality of second ports 340a may be equal to each other.

The plurality of request handlers 320a may be connected to the plurality of first ports 310a, respectively. The plurality of request handlers 320a may receive the plurality of addresses ADDR from the data processing device through the plurality of first ports 310a, and may output the plurality of data DAT corresponding to the plurality of addresses ADDR to the data processing device through the plurality of first ports 310a.

The plurality of request handlers 320a may include first to X-th request handlers 321a, 322a, . . . , 32Xa. For example, one request handler may be connected to one first port, and the number of the request handlers 321a to 32Xa may be equal to the number of the first ports PT11 to PT1X. The request handlers 321a to 32Xa may individually and/or independently process data requests that are received from the data processing device through the first ports PT11 to PT1X.

Each of the first to X-th request handlers 321a to 32Xa may include a respective one of first to X-th reserve ports RV1, RV2, . . . , RVX and respective one of first to X-th request ports RQ1, RQ2, . . . , RQX. For example, the first request handler 321a may include the first reserve port RV1 and the first request port RQ1. The reserve ports RV1 to RVX may be connected to the reserve bus 355a to form reserve interfaces, and the request ports RQ1 to RQX may be connected to the request bus 365a to form request interfaces. Although not illustrated in FIG. 2, each of the request handlers 321a to 32Xa may further include a port for connection with a respective one of the first ports PT11 to PT1X.

The cache storage 330a may be connected to the plurality of second ports 340a. The cache storage 330a may output the at least some addresses ADDR' to the memory device through the plurality of second ports 340a, and may receive the at least some data DAT' corresponding to the at least some addresses ADDR' from the memory device.

The cache storage 330a may include a plurality of cache banks. For example, the plurality of cache banks may include first to Y-th cache banks 331a, 332a, . . . , 33Ya. For example, one cache bank may be connected to one second port directly or indirectly through a bus, and the number of the cache banks 331a to 33Ya may be equal to the number of the second ports PT21 to PT2Y. The cache banks 331a to 33Ya may individually and/or independently access the memory device through the second ports PT21 to PT2Y.

Each of the first to Y-th cache banks 331a to 33Ya may include a respective one of first to Y-th reserve ports CV1, CV2, . . . , CVY and a respective one of first to Y-th request ports CQ1, CQ2, . . . , CQY. For example, the first cache bank 331a may include the first reserve port CV1 and the first request port CQ1. The reserve ports CV1 to CVY may be connected to the reserve bus 355a to form reserve interfaces, and the request ports CQ1 to CQY may be connected to the request bus 365a to form request interfaces.

Although not illustrated in FIG. 2, each of the cache banks 331a to 33Ya may further include a port for connection with a respective one of the second ports PT21 to PT2Y.

Each of the reserve bus 355a and the request bus 365a may include an arbitrary bus and/or an arbitrary bus matrix (not shown).

A plurality of reserve interfaces that include the reserve ports RV1 to RVX, the reserve ports CV1 to CVY, and the reserve bus 355a may be formed between the request handlers 321a to 32Xa and the cache banks 331a to 33Ya. Additionally or alternatively, a plurality of request interfaces that include the request ports RQ1 to RQX, the request ports CQ1 to CQY and the request bus 365a may be formed between the request handlers 321a to 32Xa and the cache banks 331a to 33Ya. As shown in FIG. 2, both ends of the plurality of reserve interfaces may be connected to a number of the request handlers 321a to 32Xa and a number of the cache banks 331a to 33Ya by the reserve bus 355a, and both ends of the plurality of request interfaces may be connected to a number of the request handlers 321a to 32Xa and a number of the cache banks 331a to 33Ya by the request bus 365a.

In some example embodiments, one reserve interface and one request interface may be formed between one request handler and one cache bank. For example, a first reserve interface and a first request interface may be formed between the first request handler 321a and the first cache bank 331a. The first reserve interface may include the first reserve port RV1 in the first request handler 321a, the first reserve port CV1 in the first cache bank 331a, the reserve bus 355a, and signal transmission lines connecting the reserve ports RV1 and CV1 and the reserve bus 355a. The first request interface may include the first request port RQ1 in the first request handler 321a, the first request port CQ1 in the first cache bank 331a, the request bus 365a, and signal transmission lines connecting the request port RQ1 and CQ1 and the request bus 365a.

Figure 3:
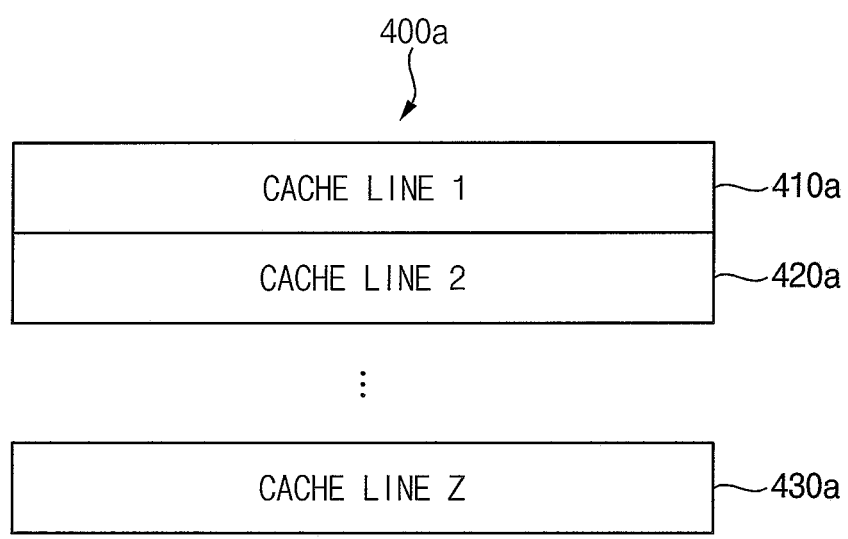
FIG. 3 is a diagram illustrating an example of a cache bank included in a multi-port queueing cache of FIG. 2.
Figure 4:
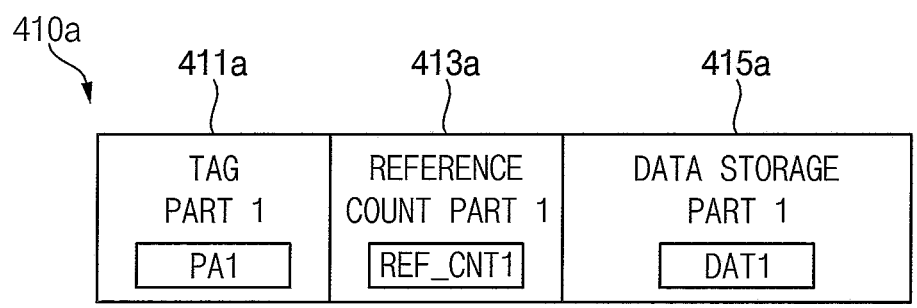
FIGS. 4 and 5 are diagrams illustrating an example of a cache line included in a cache bank of FIG. 3.
Figure 5:
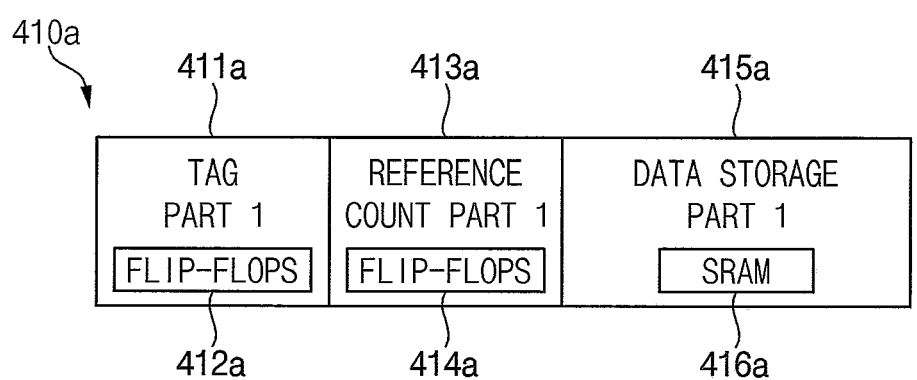

FIG. 3 is a diagram illustrating an example of a cache bank included in a multi-port queueing cache of FIG. 2. FIGS. 4 and 5 are diagrams illustrating an example of a cache line included in a cache bank of FIG. 3.

Referring to FIG. 3, a cache bank 400a may include a plurality of cache lines. For example, the plurality of cache lines may include first to Z-th cache lines 410a, 420a, . . . , 430a, where Z is an integer greater than one. For example, one cache line may be allocated or assigned for one address (e.g., one address may be allocated to one cache line), and one cache line may store one data corresponding to the allocated one address.

Referring to FIGS. 3 and 4, the first cache line 410a may include a first tag part 411a, a first reference count part 413a and a first data storage part 415a.

The first tag part 411a may store a part of an address allocated to the first cache line 410a (and/or may store a value corresponding to the allocated address). For example, when a first address (e.g., an address ADDR1 in FIG. 6) is allocated to the first cache line 410a, the first tag part 411a may store a part PA1 of the first address ADDR1. For example, the address allocated to the first cache line 410a may be checked and/or identified based on the value stored in the first tag part 411a.

The first data storage part 415a may store data corresponding to the address allocated to the first cache line 410a. For example, when the first address ADDR1 is allocated to the first cache line 410a, the first data storage part 415a may store first data DAT1 corresponding to the first address ADDR1.

The first reference count part 413a may store a first reference count value REF_CNT1 for the first cache line 410a. The first reference count value REF_CNT1 may increase and/or decrease depending on an operation associated with or related to the first cache line 410a. For example, when a prefetch operation is performed on the first cache line 410a (e.g., when the first address ADDR1 is allocated to the first cache line 410a and the first data DAT1 is stored in the first cache line 410a), the first reference count value REF_CNT1 may increase. For another example, when the first data DAT1 stored in the first cache line 410a is used or consumed (e.g., when the first data DAT1 stored in the first data storage part 415a is output), the first reference count value REF_CNT1 may decrease. For another example, when the first address ADDR1 is allocated to the first cache line 410a and the first data DAT1 is stored in the first cache line 410a, the first reference count value REF_CNT1 may have a value greater than zero.

When the first cache line 410a is not being used (e.g., when any address is not allocated to the first cache line 410a), the first tag part 411a and the first data storage part 415a may be empty without storing specific values and/or data, and the first reference count value REF_CNT1 stored in the first reference count part 413a may be zero.

Referring to FIGS. 3 and 5, in the first cache line 410a included in the cache bank 400a, the first tag part 411a may include a plurality of flip-flops 412a, the first reference count part 413a may include a plurality of flip-flops 414a, and the first data storage part 415a may include a static random access memory (SRAM) 416a.

Although not illustrated in FIGS. 4 and 5, each of the other cache lines 420a and 430a included in the cache bank 400a may have a configuration substantially similar to the first cache line 410a.

Figure 6:
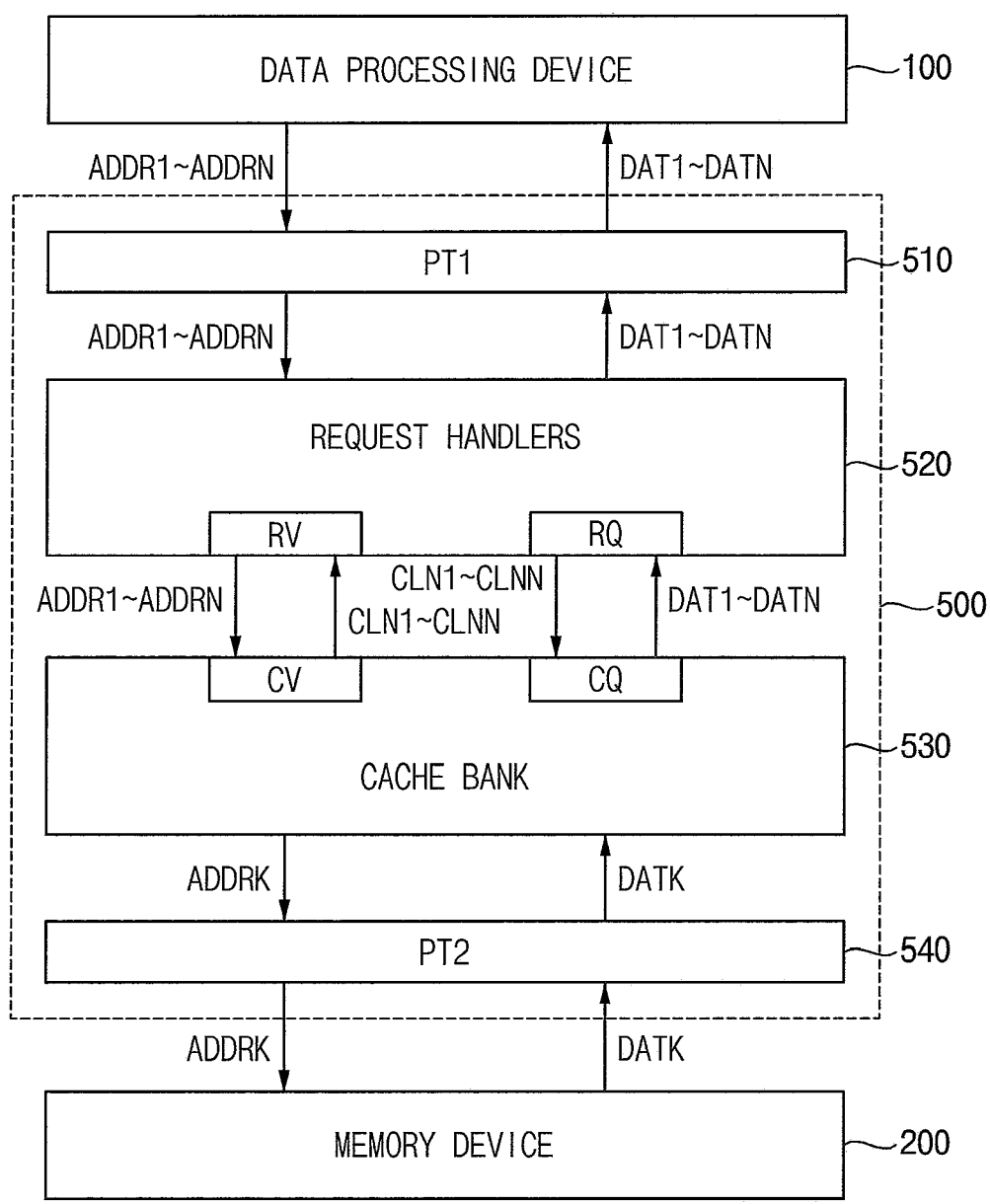
FIG. 6 is a diagram for describing an operation of a multi-port queueing cache of FIG. 2.

FIG. 6 is a diagram for describing an operation of a multi-port queueing cache of FIG. 2.

Referring to FIG. 6, a signal/data transmission process between the data processing device 100, a multi-port queueing cache 500 and the memory device 200 is illustrated, and an operation between one request handler and one cache bank is illustrated. The multi-port queueing cache 500 may include or may be similar in many respects to the multi-port queueing caches 300 and 300a described above in reference to FIGS. 1 and 2, respectively, and may include additional features not described above.

The multi-port queueing cache 500 may include a first port 510, a request handler 520, a cache bank 530 and a second port 540. The first port 510 may be one of the first ports PT11 to PT1X in FIG. 2, the request handler 520 may be one of the request handlers 321a to 32Xa in FIG. 2, the cache bank 530 may be one of the cache banks 331a to 33Ya in FIG. 2, and the second port 540 may be one of the second ports PT21 to PT2Y in FIG. 2. The request handler 520 may include a reserve port RV and a request port RQ, and the cache bank 530 may include a reserve port CV and a request port CQ. A reserve interface may be formed by the reserve ports RV and CV and signal transmission lines connecting the reserve ports RV and CV, and a request interface may be formed by the request ports RQ and CQ and signal transmission lines connecting the request ports RQ and CQ.

The data processing device 100 may sequentially transfer first to N-th addresses ADDR1 to ADDRN to the multi-port queueing cache 500, where N is an integer greater than one.

The request handler 520 may sequentially receive the first to N-th addresses ADDR1 to ADDRN through the first port 510, and may sequentially transfer the first to N-th addresses ADDR1 to ADDRN, which are received through the first port 510, to the cache bank 530 through the reserve interface (e.g., through the reserve ports RV and CV).

The cache bank 530 may transfer cache line numbers CLN1 to CLNN of first to N-th cache lines, to which the first to N-th addresses ADDR1 to ADDRN are allocated, to the request handler 520 through the reserve interface (e.g., the reserve ports RV and CV). Additionally or alternatively, the cache bank 530 may output a K-th address ADDRK among the first to N-th addresses ADDR1 to ADDRN to the memory device 200 through the second port 540, where K is an integer greater than or equal to one and less than or equal to N, may receive K-th data DATK corresponding to the K-th address ADDRK from the memory device 200 through the second port 540, and may store the K-th data DATK. For example, the K-th data DATK may be data that is not stored in the cache bank 530. Data stored in the cache bank 530 may not be additionally received from the memory device 200.

The request handler 520 may sequentially transfer the cache line numbers CLN1 to CLNN of the first to N-th cache lines, which are received through the reserve interface (e.g., through the reserve ports RV and CV), to the cache bank 530 through the request interface (e.g., through the request ports RQ and CQ).

The cache bank 530 may sequentially transfer first to N-th data DAT1 to DATN, which are stored in the first to N-th cache lines and correspond to the first to N-th addresses ADDR1 to ADDRN, to the request handler 520 through the request interface (e.g., through the request ports RQ and CQ).

The request handler 520 may output the first to N-th data DAT1 to DATN, which are received through the request interface (e.g., through the request ports RQ and CQ), through the first port 510.

The data processing device 100 may sequentially receive the first to N-th data DAT1 to DATN from the multi-port queueing cache 500. For example, an order of receiving the first to N-th data DAT1 to DATN may correspond to an order of the first to N-th addresses ADDR1 to ADDRN.

Figure 7:
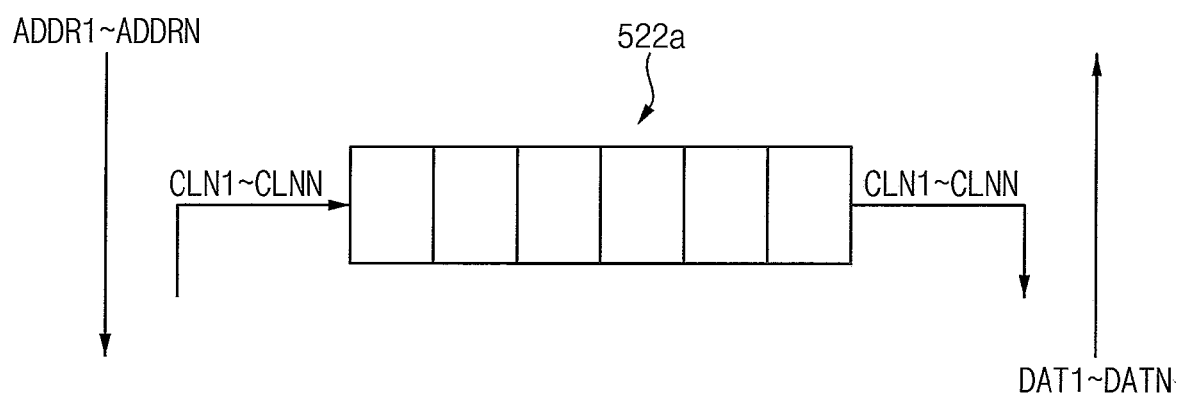
FIG. 7 is a block diagram illustrating an example of a request handler included in a multi-port queueing cache of FIG. 6.

FIG. 7 is a block diagram illustrating an example of a request handler included in a multi-port queueing cache of FIG. 6.

Referring to FIGS. 6 and 7, a request handler 520a may include a request queue 522a. The request queue 522a may sequentially queue the cache line numbers CLN1 to CLNN of the first to N-th cache lines, which are received through the reserve interface (e.g., through the reserve ports RV and CV), and may sequentially output the cache line numbers CLN1 to CLNN of the first to N-th cache lines through the request interface (e.g., through the request ports RQ and CQ). For example, the request queue 522a may be implemented in the form of a ring buffer.

Additionally or alternatively, the request handler 520a may transfer the first to N-th addresses ADDR1 to ADDRN, which are received from the data processing device 100, to the cache bank 530, and may output the first to N-th data DAT1 to DATN, which are received from the cache bank 530, to the data processing device 100. Although not illustrated in FIG. 7, the request handler 520a may further include an address buffer for storing the first to N-th addresses ADDR1 to ADDRN, which are received from the data processing device 100, and/or a data buffer for storing the first to N-th data DAT1 to DATN, which are received from the cache bank 530 and output to the data processing device 100.

Figure 8:
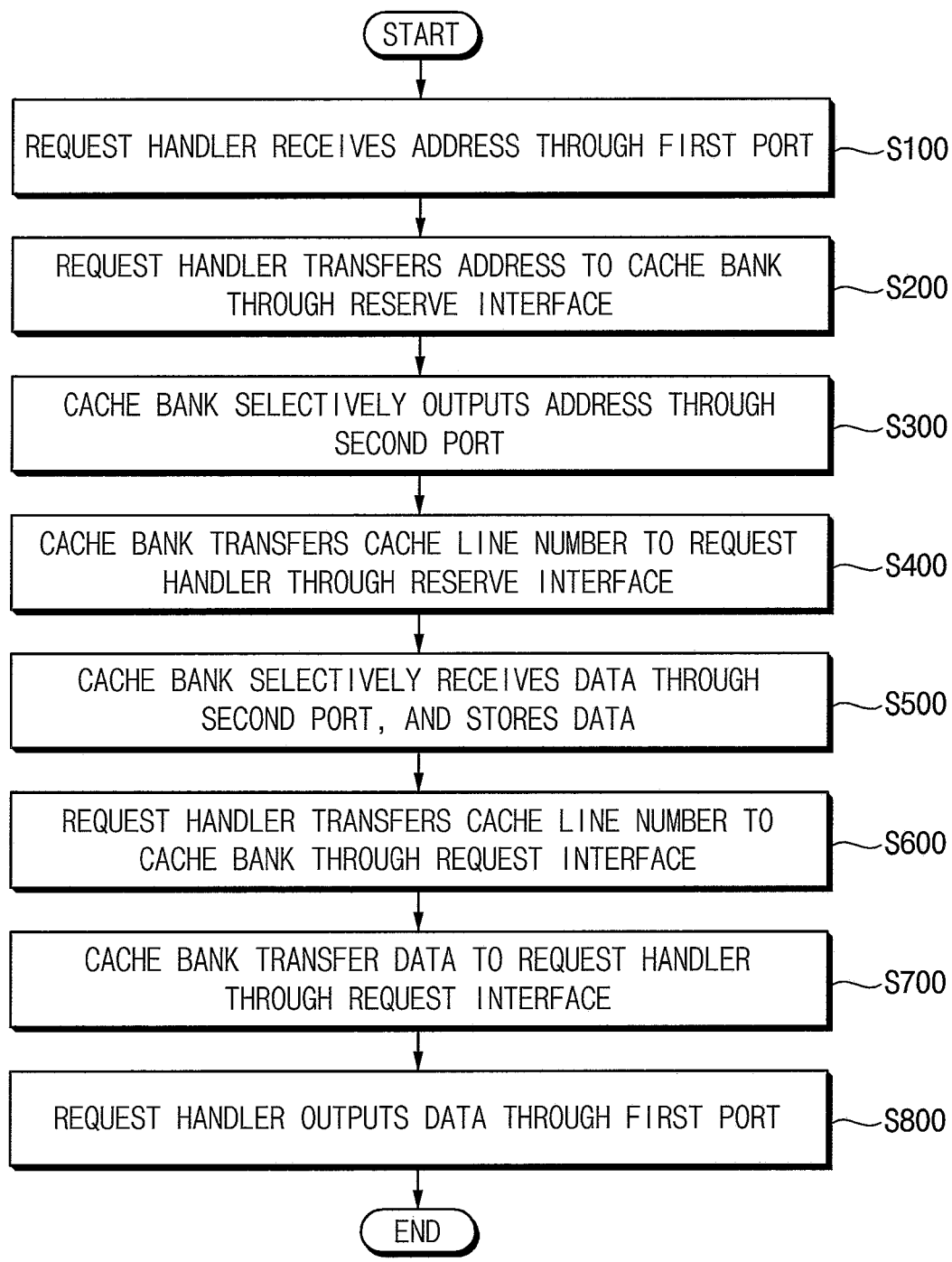
FIG. 8 is a flowchart illustrating a method of operating a multi-port queueing cache according to example embodiments.

FIG. 8 is a flowchart illustrating a method of operating a multi-port queueing cache according to example embodiments.

Referring to FIGS. 6 and 8, an operation between one request handler 520 and one cache bank 530 is illustrated, and an operation of transferring one address and one data corresponding thereto is illustrated.

The request handler 520 may receive one address from the data processing device 100 through the first port 510 (step S100). The request handler 520 may transfer the one address to the cache bank 530 through the reserve interface (e.g., through the reserve ports RV and CV) (step S200).

The cache bank 530 may selectively output the one address to the memory device 200 through the second port 540 (step S300). The cache bank 530 may transfer a cache line number of a cache line, to which the one address is allocated, to the request handler 520 through the reserve interface (e.g., through the reserve ports RV and CV) (step S400). Steps S300 and S400 are further described with reference to FIG. 9.

The cache bank 530 may selectively receive one data corresponding to the one address from the memory device 200 through the second port 540, and may store the one data (step S500). Step S500 is further described with reference to FIG. 10.

Thereafter, the request handler 520 may transfer the cache line number of the cache line, to which the one address is allocated, to the cache bank 530 through the request interface (e.g., through the request ports RQ and CQ) (step S600). The cache bank 530 may transfer the one data corresponding to the one address to the request handler 520 through the request interface (e.g., through the request ports RQ and CQ) (step S700). Step S700 is further described with reference to FIG. 10.

The request handler 520 may output the one data corresponding to the one address to the data processing device 100 through the first port 510 (step S800).

The one address and the one data corresponding thereto may be one of the first to N-th addresses ADDR1 to ADDRN in FIG. 6 and one of the first to N-th data DAT1 to DATN in FIG. 6, respectively. Steps S100 through S800 in FIG. 8 may be sequentially performed for each and all of the first to N-th addresses ADDR1 to ADDRN and the first to N-th data DAT1 to DATN.

Although FIG. 8 illustrates that step S500 is performed first and then step S600 is performed, an order of steps S500 and S600 may be changed according to example embodiments.

Figure 9:
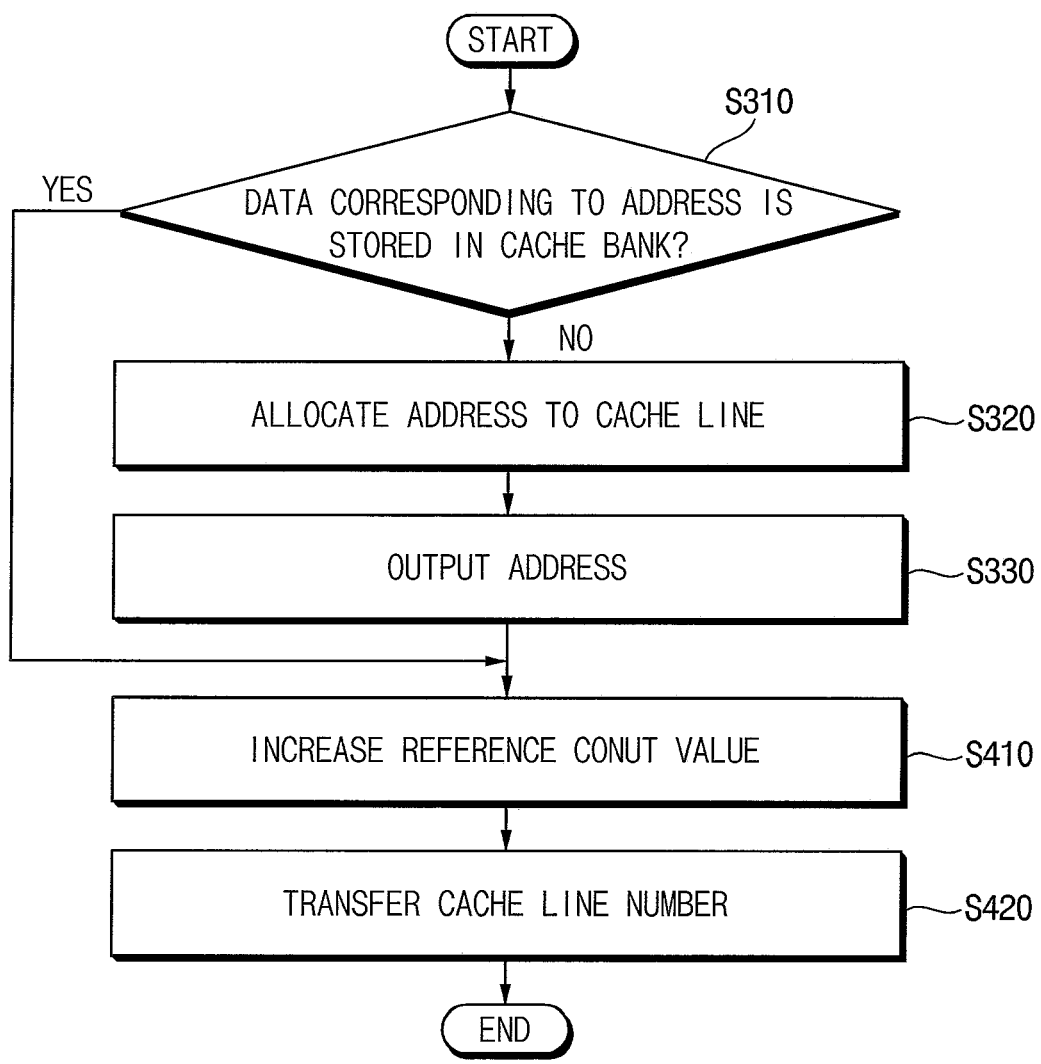
FIG. 9 is a flowchart illustrating an example of selectively outputting an address and transferring a cache line number to a request handler in FIG. 8.

FIG. 9 is a flowchart illustrating an example of selectively outputting an address and transferring a cache line number to a request handler in FIG. 8.

Referring to FIGS. 6, 8 and 9, when the cache bank 530 selectively outputs the one address to the memory device 200 through the second port 540 (step S300), the cache bank 530 may check whether the one data corresponding to the one address is stored in the cache bank 530 (e.g., may check whether a cache line to which the one address is allocated exists) (step S310).

When the one data corresponding to the one address is not stored in the cache bank 530 (e.g., when the cache line to which the one address is allocated does not exist) (step S310: NO), the cache bank 530 may allocate one cache line to the one address (step S320), and may output the one address to the memory device 200 through the second port 540 (step S330). For example, the one cache line to which the one address is allocated may be a cache line that has a reference count value of zero (e.g., a cache line to which any address does not allocated and that is not being used).

When the one data corresponding to the one address is stored in the cache bank 530 (e.g., when the cache line to which the one address is allocated exists) (step S310: YES), steps S320 and S330 may not be performed.

When the cache bank 530 transfers the cache line number of the cache line to which the one address is allocated to the request handler 520 (step S400), the cache bank 530 may increase the reference count value of the one cache line to which the one address is allocated (step S410), and may transfer the cache line number of the one cache line to the request handler 520 through the reserve interface (e.g., through the reserve ports RV and CV) (step S420).

Figure 10:
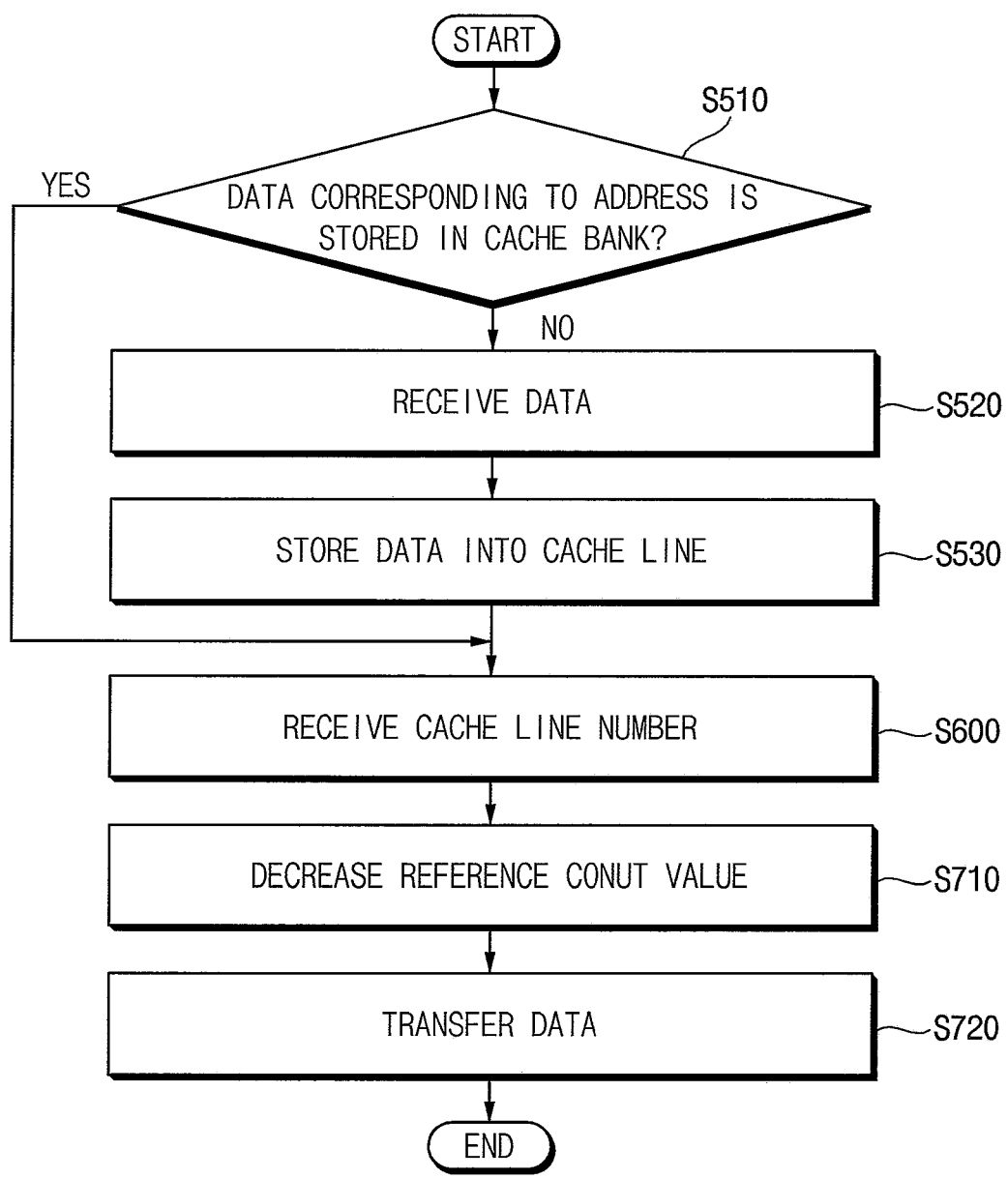
FIG. 10 is a flowchart illustrating an example of selectively receiving data, storing data and transferring data to a request handler in FIG. 8.

FIG. 10 is a flowchart illustrating an example of selectively receiving data, storing data and transferring data to a request handler in FIG. 8.

Referring to FIGS. 6, 8 and 10, when the cache bank 530 selectively receives the one data corresponding to the one address from the memory device 200 through the second port 540 (step S500), step S510 may be substantially similar to step S310 in FIG. 9. For example, when step S310 has already been performed, step S510 may not be performed.

When the one data corresponding to the one address is not stored in the cache bank 530 (step S510: NO), the cache bank 530 may receive the one data corresponding to the one address from the memory device 200 (step S520), and may store the one data into the one cache line to which the one address is allocated (step S520). For example, the one data may be stored in a data storage part included in the one cache line.

When the one data corresponding to the one address is stored in the cache bank 530 (step S510: YES), steps S520 and S530 may not be performed.

Thereafter, the request handler 520 may transfer the cache line number of the one cache line to which the one address is allocated to the cache bank 530, and the cache bank 530 may receive the cache line number of the one cache line to which the one address is allocated (step S600). Step S600 may be substantially similar to step S600 in FIG. 8.

When the cache bank 530 transfers the one data corresponding to the one address to the request handler 520 through the request interface (e.g., through the request ports RQ and CQ) (step S700), the cache bank 530 may decrease the reference count value of the one cache line to which the one address is allocated (step S710), and may transfer the one data to the request handler 520 through the request interface (e.g., through the request ports RQ and CQ) (step S720).

Figure 11:
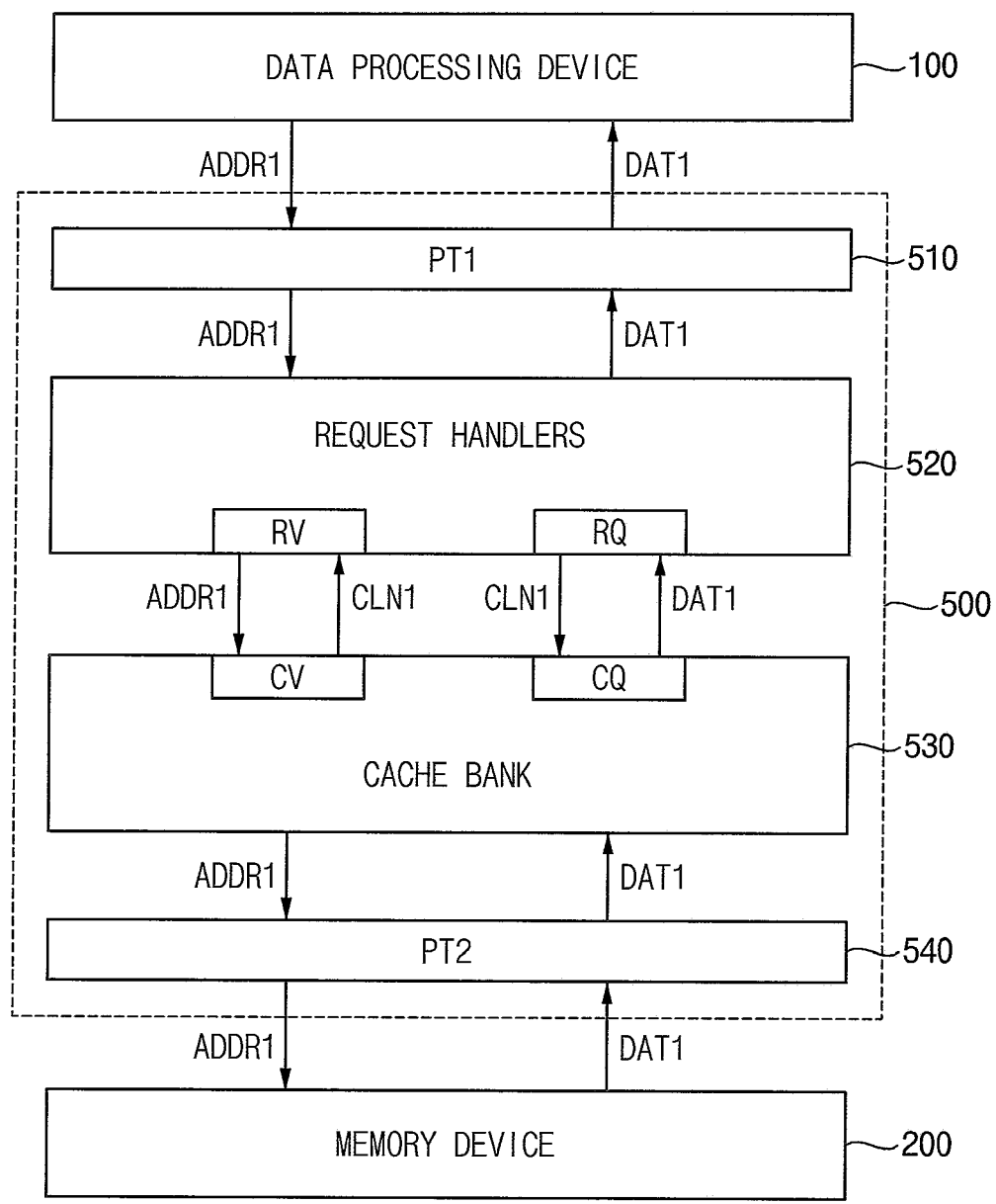
FIGS. 11 and 12 are diagrams for describing an operation of a multi-port queueing cache of FIG. 2.
Figure 12:
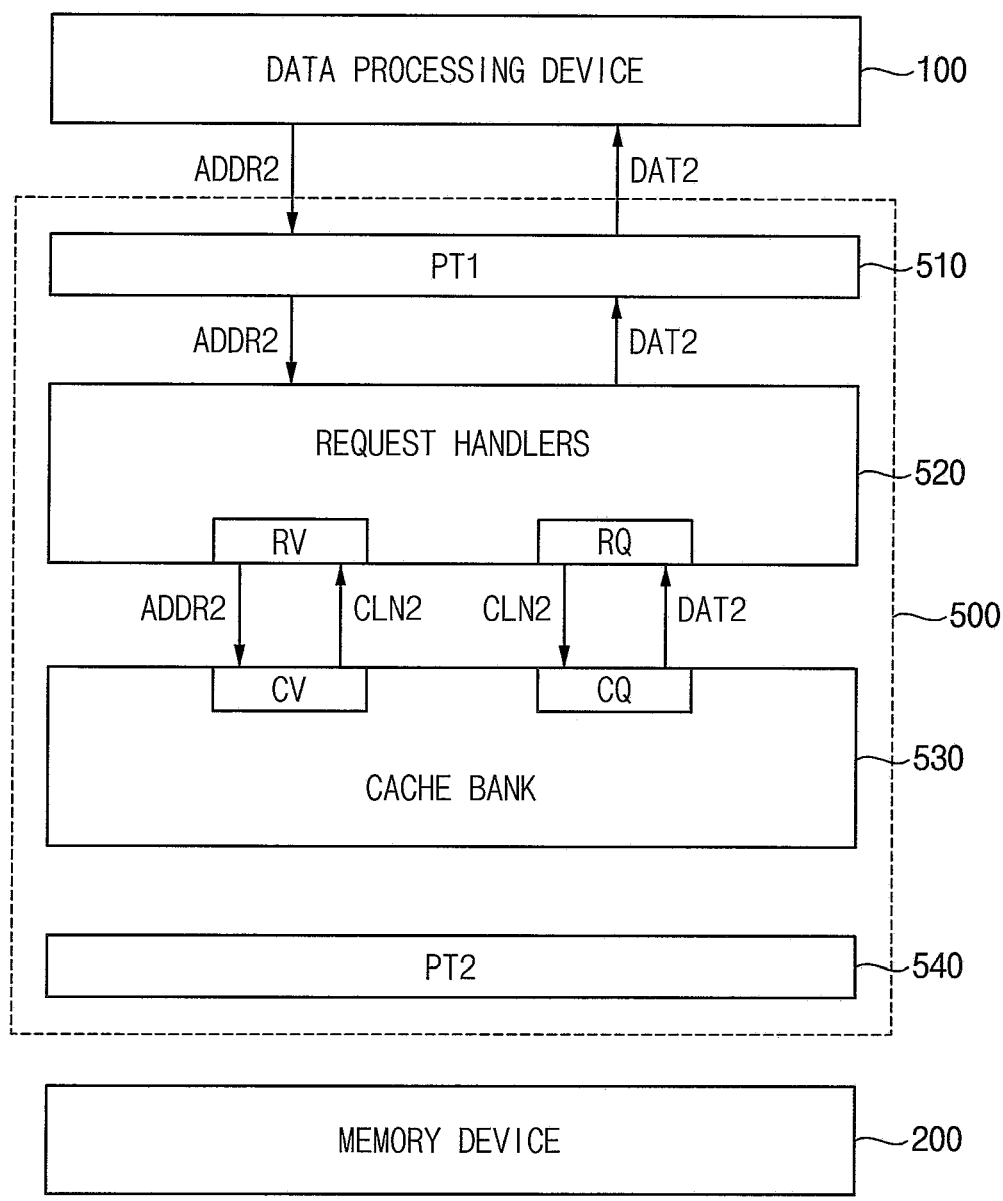

FIGS. 11 and 12 are diagrams for describing an operation of a multi-port queueing cache of FIG. 2. The descriptions repeated with FIG. 6 are omitted for the sake of brevity.

Referring to FIGS. 11 and 12, an operation between one request handler 520 and one cache bank 530 is illustrated, and an operation of transferring one address and one data corresponding thereto, which is described with reference to FIGS. 8, 9 and 10, is illustrated.

FIG. 11 illustrates an operation when the first data DAT1 corresponding to the first address ADDR1 is not stored in the cache bank 530.

For example, the request handler 520 may receive the first address ADDR1 from the data processing device 100 through the first port 510, and may transfer the first address ADDR1 to the cache bank 530 through the reserve interface. The cache bank 530 may allocate the first address ADDR1 to a first cache line, may output the first address ADDR1 to the memory device 200 through the second port 540, may transfer a cache line number of the first cache line to the request handler 520 through the reserve interface, may receive the first data DAT1 from the memory device 200 through the second port 540, and may store the first data DAT1 into the first cache line. Thereafter, the request handler 520 may transfer the cache line number of the first cache line to the cache bank 530 through the request interface, the cache bank 530 may transfer the first data DAT1 to the request handler 520 through the request interface, and the request handler 520 may output the first data DAT1 to the data processing device 100 through the first port 510.

In some example embodiments, before the first address ADDR1 is allocated to the first cache line, a first reference count value of the first cache line may be zero. After the first address ADDR1 is allocated to the first cache line and before the cache line number of the first cache line is transferred to the request handler 520, the first reference count value may be increased. Before the first data DAT1 stored in the first cache line is transferred to the request handler 520, the first reference count value may be decreased.

FIG. 12 illustrates an operation when second data DAT2 corresponding to a second address ADDR2 is stored in the cache bank 530.

For example, the request handler 520 may receive the second address ADDR2 from the data processing device 100 through the first port 510, and may transfer the second address ADDR2 to the cache bank 530 through the reserve interface. The cache bank 530 may transfer a cache line number of the second cache line, to which the second address ADDR2 is allocated and that stores the second data DAT2, to the request handler 520 through the reserve interface, without outputting the second address ADDR2 through the second port 540 and without receiving the second data DAT2 through the second port 540. Thereafter, the request handler 520 may transfer the cache line number of the second cache line to the cache bank 530 through the request interface, the cache bank 530 may transfer the second data DAT2 to the request handler 520 through the request interface, and the request handler 520 may output the second data DAT2 to the data processing device 100 through the first port 510.

In some example embodiments, before the cache line number of the second cache line is transmitted to the request handler 520, a second reference count value of the second cache line may be increased. Before the second data DAT2 stored in the second cache line is transferred to the request handler 520, the second reference count value may be decreased.

Figure 13:
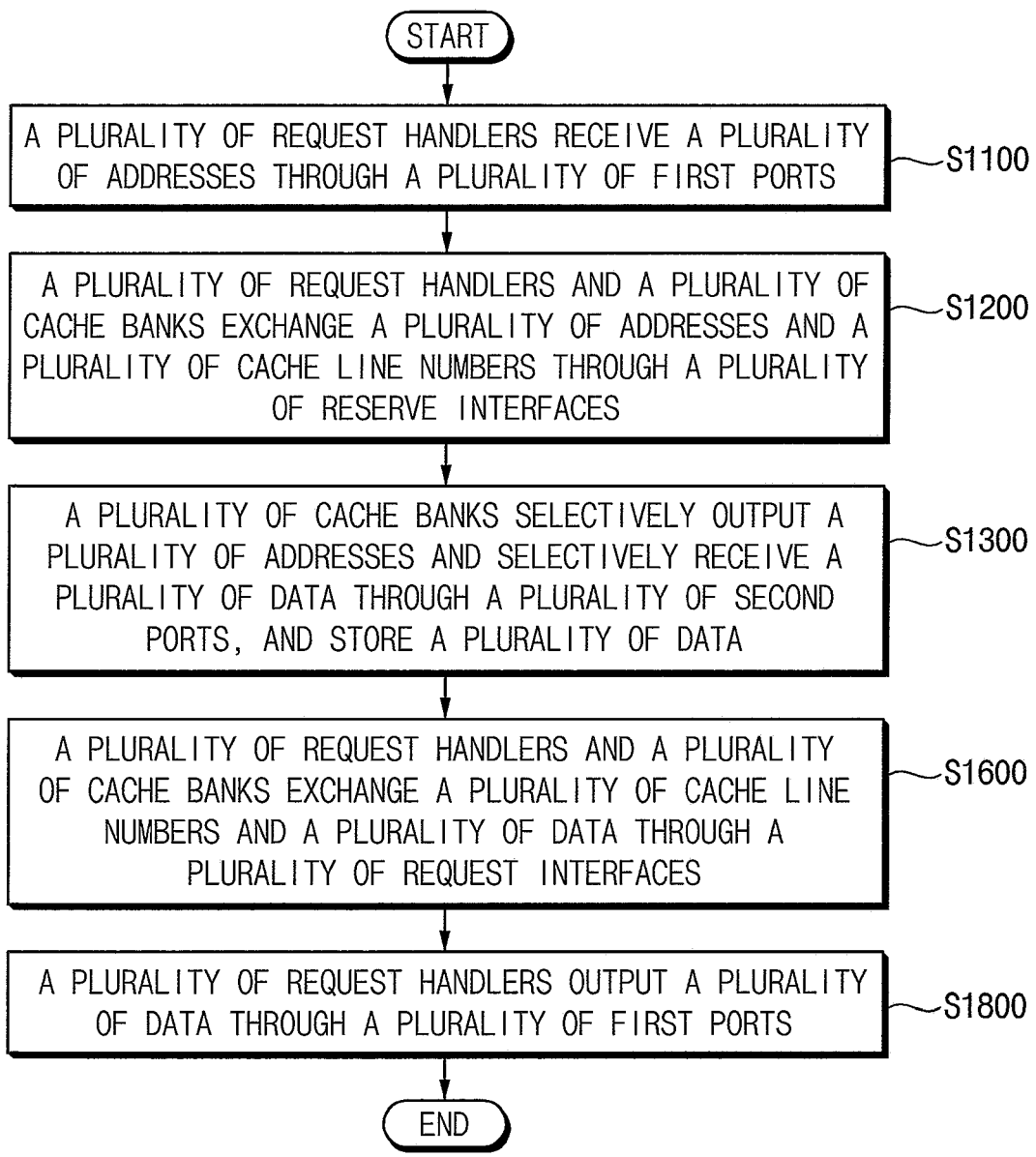
FIG. 13 is a flowchart illustrating a method of operating a multi-port queueing cache according to example embodiments.

FIG. 13 is a flowchart illustrating a method of operating a multi-port queueing cache according to example embodiments. The descriptions repeated with FIG. 8 are omitted for the sake of brevity.

Referring to FIGS. 2 and 13, operations between the plurality of request handlers 321a to 32Xa and the plurality of cache banks 331a to 33Ya are illustrated, and operations of transferring the plurality of addresses ADDR and the plurality of data DAT corresponding thereto are illustrated.

The plurality of request handlers 321a to 32Xa may receive the plurality of addresses ADDR from the data processing device 100 through the plurality of first ports PT11 to PT1X (step S1100). Step S1100 may be similar to step S100 in FIG. 8, except that step S1100 is performed by the plurality of request handlers 321a to 32Xa.

The plurality of request handlers 321a to 32Xa and the plurality of cache banks 331a to 33Ya may exchange the plurality of addresses ADDR and cache line numbers of the plurality of cache lines, to which the plurality of addresses ADDR are allocated, through the plurality of reserve interfaces (step S1200). Step S1200 may be similar to steps S200 and S400 in FIG. 8, except that step S1200 is performed by the plurality of request handlers 321a to 32Xa and the plurality of cache banks 331a to 33Ya.

The plurality of cache banks 331a to 33Ya may selectively output the plurality of addresses ADDR to the memory device 200 through the plurality of second ports PT21 to PT2Y, may selectively receive the plurality of data DAT corresponding to the plurality of addresses ADDR from the memory device 200, and may store the plurality of data DAT (step S1300). Step S1300 may be similar to steps S300 and S500 in FIG. 8 except that step S1300 is performed by the plurality of cache banks 331a to 33Ya.

The plurality of request handlers 321a to 32Xa and the plurality of cache banks 331a to 33Ya may exchange the cache line numbers of the plurality of cache lines, to which the plurality of addresses ADDR are allocated, and the plurality of data DAT through the plurality of request interfaces (step S1600). Step S1600 may be similar to steps S600 and S700 in FIG. 8, except that step S1600 is performed by the plurality of request handlers 321a to 32Xa and the plurality of cache banks 331a to 33Ya.

The plurality of request handlers 321a to 32Xa may output the plurality of data DAT to the data processing device 100 through the plurality of first ports PT11 to PT1X (step S1800). Step S1800 may be similar to step S800 in FIG. 8, except that step S1800 is performed by the plurality of request handlers 321a to 32Xa.

Figure 14:
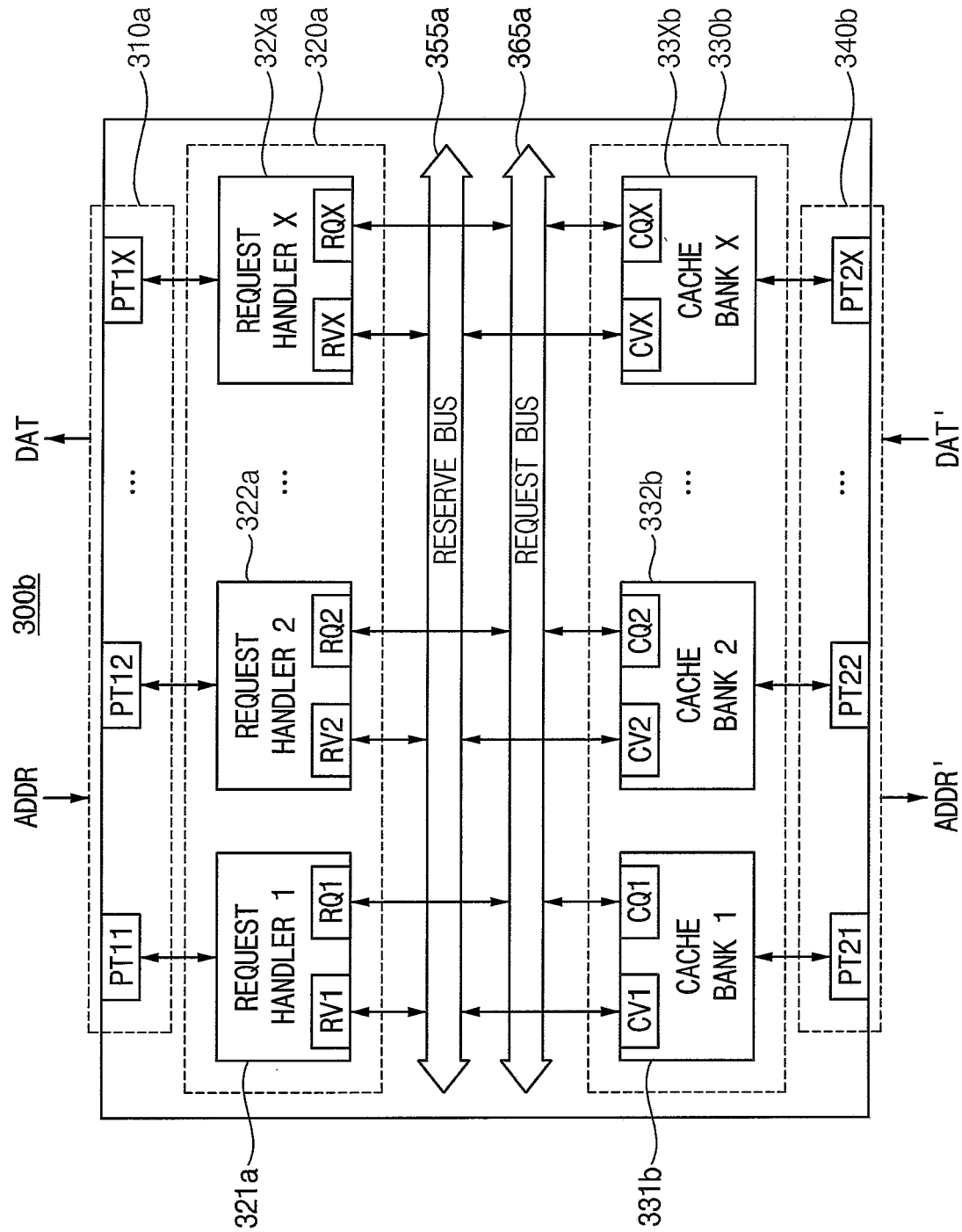
FIG. 14 is a block diagram illustrating an example of a multi-port queueing cache according to example embodiments.

FIG. 14 is a block diagram illustrating an example of a multi-port queueing cache according to example embodiments. The descriptions repeated with FIG. 2 are omitted for the sake of brevity.

Referring to FIG. 14, a multi-port queueing cache 300b may include a plurality of first ports 310a, a plurality of request handlers 320a, a cache storage 330b and a plurality of second ports 340b. The multi-port queueing cache 300b may further include a reserve bus 355a and a request bus 365a.

The multi-port queueing cache 300b may be substantially similar to the multi-port queueing cache 300 of FIG. 2, except that configurations of the cache storage 330b and the plurality of second ports 340b are changed. That is, the multi-port queueing cache 300b may include or may be similar in many respects to the multi-port queueing caches 300, 300a, and 500 described above in reference to FIGS. 1, 2, and 6, respectively, and may include additional features not described above.

The plurality of second ports 340b may include X second ports PT21, PT22, . . . , PT2X. The cache storage 330b may include first to X-th cache banks 331b, 332b, . . . , 33Xb. Each of the cache banks 331b to 33Xb may include a respective one of reserve ports CV1, CV2, . . . , CVX and a respective one of request ports CQ1, CQ2, . . . , CQX.

A plurality of reserve interfaces that include the reserve ports RV1 to RVX, the reserve ports CV1 to CVX and the reserve bus 355a may be formed between the request handlers 321a to 32Xa and the cache banks 331b to 33Xb. A plurality of request interfaces that include the request ports RQ1 to RQX, the request ports CQ1 to CQX and the request bus 365a may be formed between the request handlers 321a to 32Xa and the cache banks 331b to 33Xb. As shown in FIG. 14, the number of request handlers 321a to 32Xa and the number of cache banks 331b to 33Xb may be equal to each other. As with that described with reference to FIG. 2, one reserve interface and one request interface may be formed between one request handler and one cache bank.*

In the examples of the multi-port queueing caches 300a and 300b of FIGS. 2 and 14, to increase the capacity and performance of the queueing cache, a cache bank-based multi-port queueing cache may be implemented by dividing the inside of the queueing cache into two modules: the request handlers and the cache banks. For example, to connect the data processing device with the plurality of ports, the multi-port queueing cache may include the plurality of request handlers the number of which is equal to the number of the plurality of ports, and the multi-port cache may also include the plurality of cache banks. Additionally or alternatively, the request handlers and the cache banks may be connected to each other through the reserve interfaces and the request interfaces.

Figure 15:
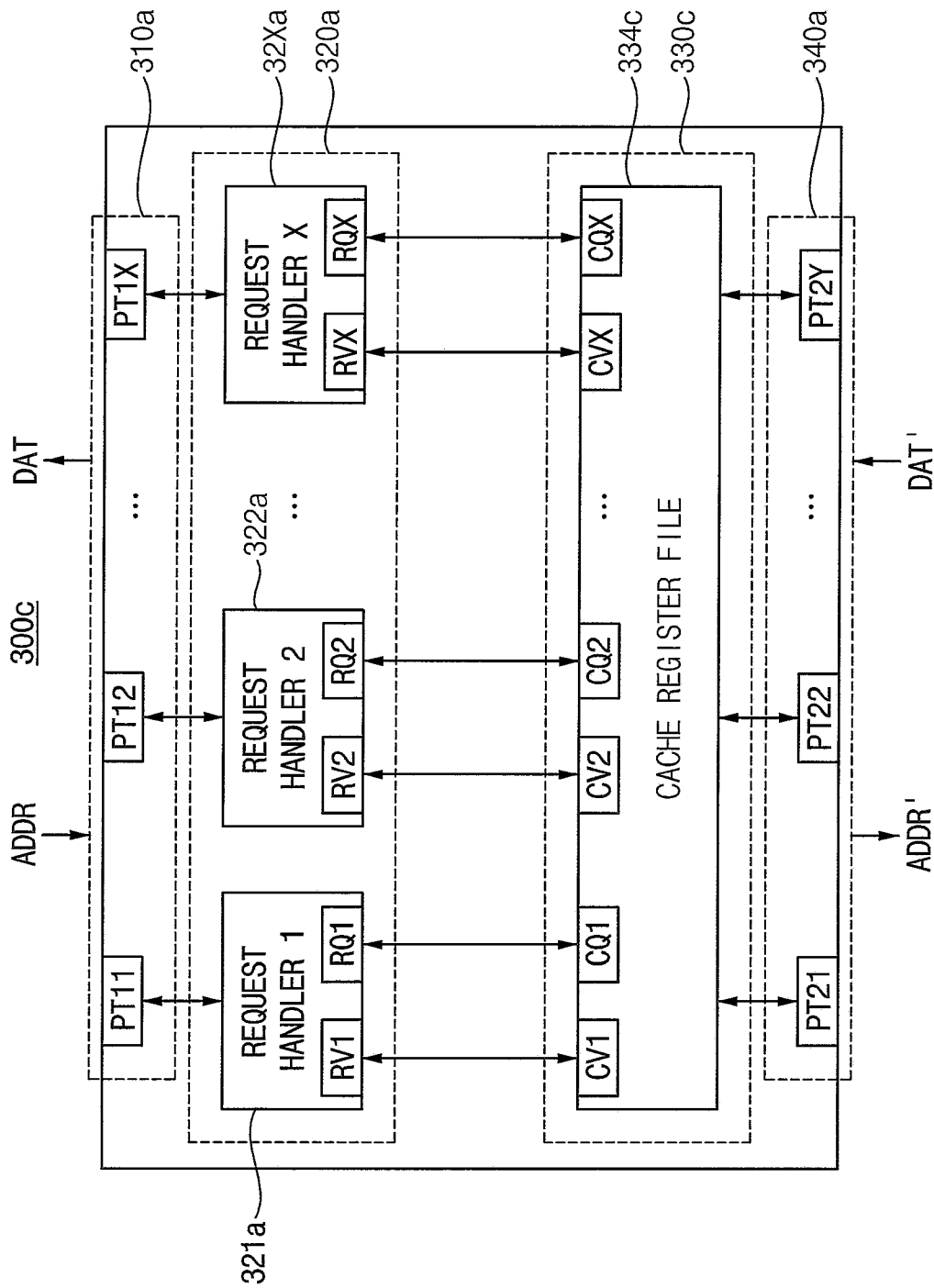
FIG. 15 is a block diagram illustrating another example of a multi-port queueing cache according to example embodiments.

FIG. 15 is a block diagram illustrating another example of a multi-port queueing cache according to example embodiments. The descriptions repeated with FIG. 2 are omitted for the sake of brevity.

Referring to FIG. 15, a multi-port queueing cache 300c may include a plurality of first ports 310a, a plurality of request handlers 320a, a cache storage 330c and a plurality of second ports 340a.

The multi-port queueing cache 300c may be substantially similar to the multi-port queueing cache 300 of FIG. 2, except that a configuration of the cache storage 330c is changed. That is, the multi-port queueing cache 300c may include or may be similar in many respects to the multi-port queueing caches 300, 300a, 500, and 300b described above in reference to FIGS. 1, 2, 6, and 14, respectively, and may include additional features not described above.

The cache storage 330c may include a cache register file 334c. The cache register file 334c may be connected to the plurality of second ports PT21 to PT2Y. The cache register file 334c may individually and/or independently access the memory device 200 through the second ports PT21 to PT2Y. The cache register file 334c may include reserve ports CV1 to CVX and request ports CQ1 to CQX.

A plurality of reserve interfaces that include the reserve ports RV1 to RVX and the reserve ports CV1 to CVX may be formed between the request handlers 321a to 32Xa and the cache register file 334c. A plurality of request interfaces that include the request ports RQ1 to RQX and the request ports CQ1 to CQX may be formed between the request handlers 321a to 32Xa and the cache register file 334c. As shown in FIG. 15, both ends of the plurality of reserve interfaces may be connected one-to-one, and both ends of the plurality of request interfaces may be connected one-to-one.

In some example embodiments, one reserve interface and one request interface may be formed between one request handler and the cache register file 334c. For example, a first reserve interface and a first request interface may be formed between the first request handler 321a and the cache register file 334c. The first reserve interface may include the first reserve port RV1 in the first request handler 321a, the first reserve port CV1 in the cache register file 334c, and signal transmission lines connecting the reserve ports RV1 and CV1. The first request interface may include the first request port RQ1 in the first request handler 321a, the first request port CQ1 in the cache register file 334c, and signal transmission lines connecting the request port RQ1 and CQ1.

Figure 16:
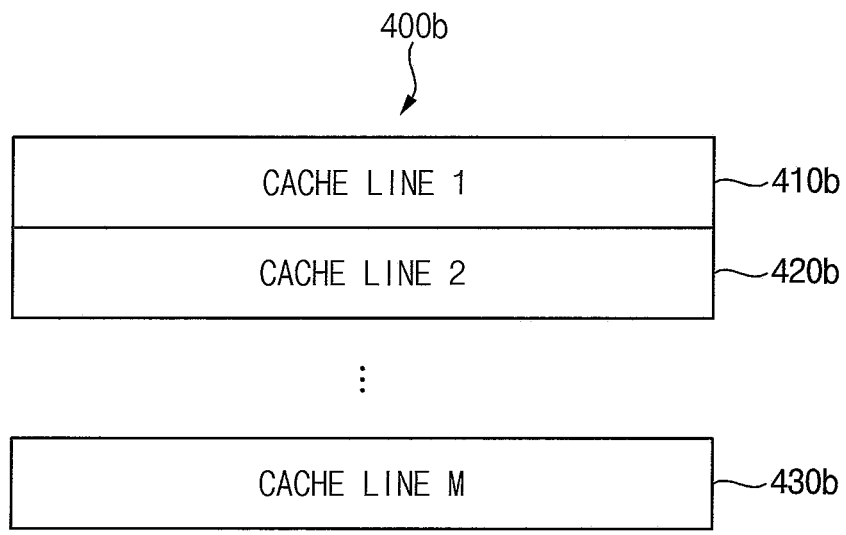
FIG. 16 is a diagram illustrating an example of a cache register file included in a multi-port queueing cache of FIG. 15.
Figure 17:
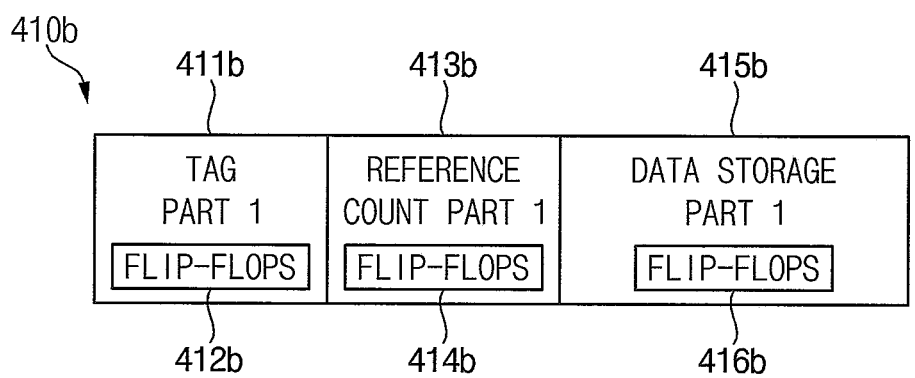
FIG. 17 is a diagram illustrating an example of a cache line included in a cache register file of FIG. 16.

FIG. 16 is a diagram illustrating an example of a cache register file included in a multi-port queueing cache of FIG. 15. FIG. 17 is a diagram illustrating an example of a cache line included in a cache register file of FIG. 16. The descriptions repeated with FIGS. 3, 4 and 5 are omitted for the sake of brevity.

Referring to FIG. 16, a cache register file 400b may include a plurality of cache lines. For example, the plurality of cache lines may include first to M-th cache lines 410b, 420b, . . . , 430b, where M is an integer greater than one.

Referring to FIGS. 16 and 17, the first cache line 410b may include a first tag part 411b, a first reference count part 413b and a first data storage part 415b. For example, as described with reference to FIG. 4, the first tag part 411b may store a part of an address allocated to the first cache line 410b, the first data storage part 415b may store data corresponding to the address allocated to the first cache line 410b, and the first reference count part 413b may store a first reference count value for the first cache line 410b.

In the first cache line 410b included in the cache register file 400b, the first tag part 411b may include a plurality of flip-flops 412b, the first reference count part 413b may include a plurality of flip-flops 414b, and the first data storage part 415b may include a plurality of flip-flops 416b.

As described with reference to FIGS. 3 and 5, the data storage part (e.g., the first data storage part 415a) in cache bank 400a may include the SRAM (e.g., the SRAM 416a). Alternatively or additionally, as described with reference to FIGS. 16 and 17, the data storage part (e.g., the first data storage part 415b) in the cache register file 400b may include the flip-flops (e.g., the flip-flops 416b). Therefore, the capacity of the cache register file 400b may be smaller than the capacity of one cache bank 400a. For example, the number (e.g., Z) of the cache lines 410a to 430a included in the cache register file 400b may be smaller than the number (e.g., M) of the cache lines 410b to 430b included in one cache bank 400a.

Figure 18:
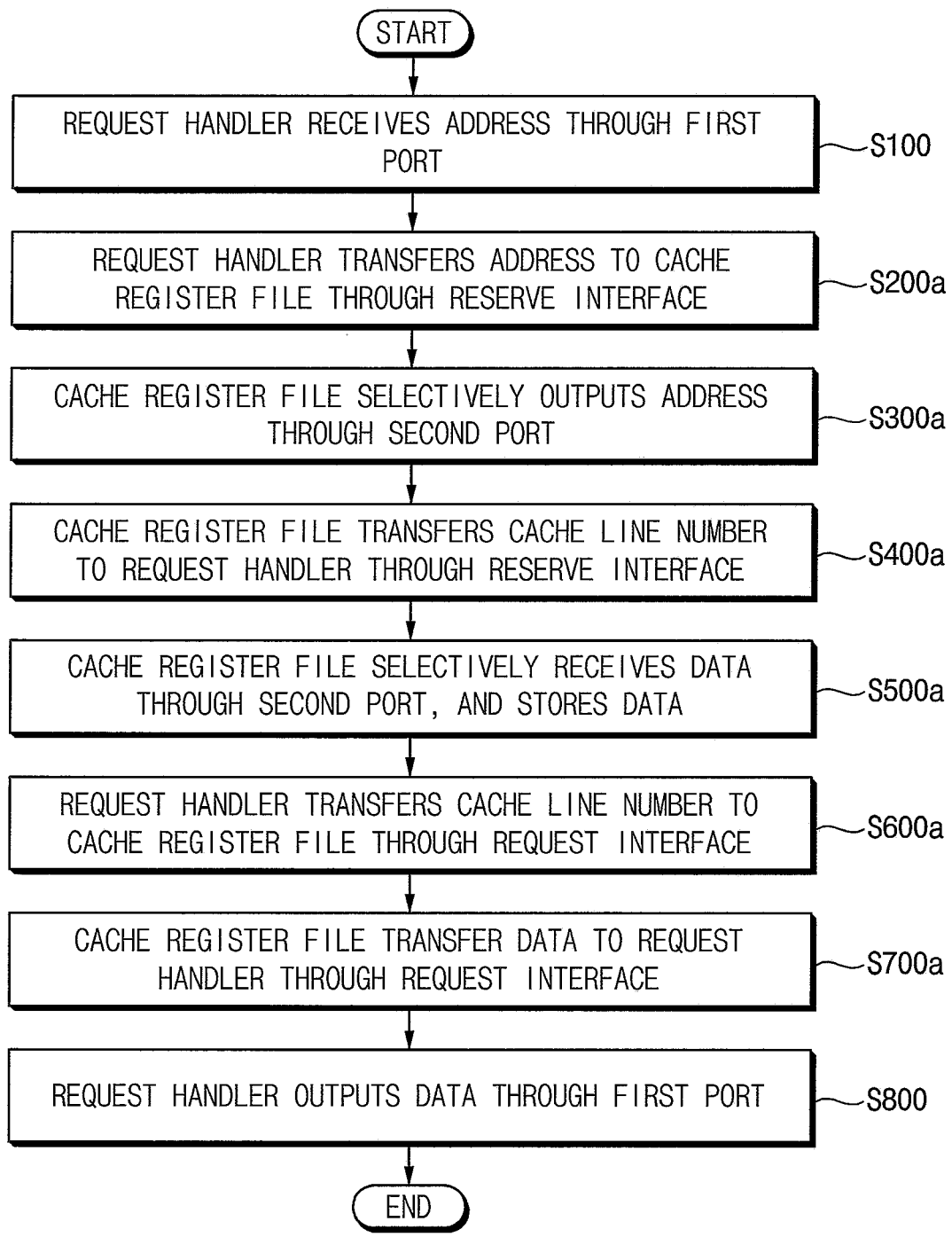
FIGS. 18 and 19 are flowcharts illustrating a method of operating a multi-port queueing cache according to example embodiments.
Figure 19:
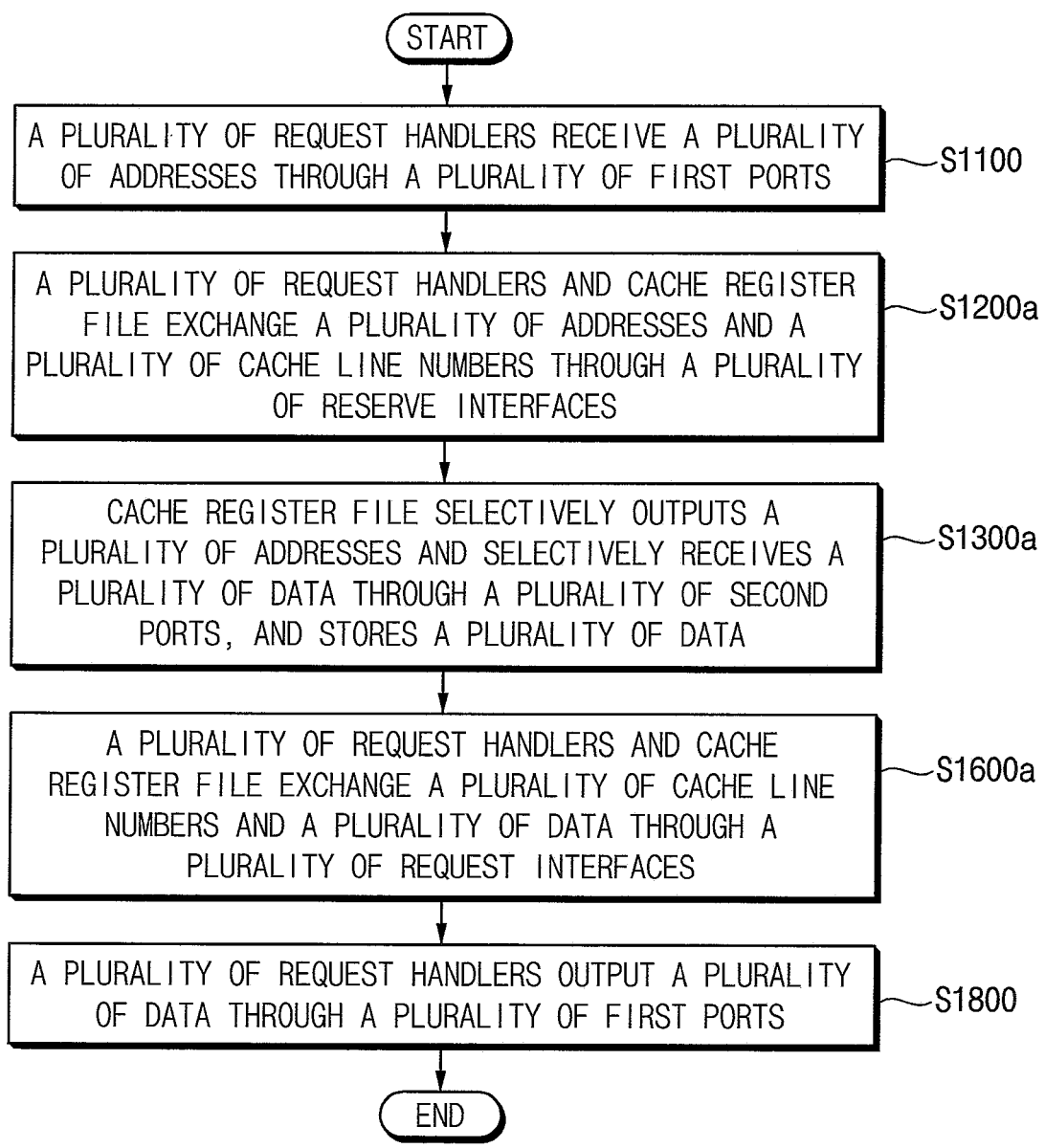

FIGS. 18 and 19 are flowcharts illustrating a method of operating a multi-port queueing cache according to example embodiments. The descriptions repeated with FIGS. 8 and 13 are omitted for the sake of brevity.

Referring to FIGS. 15 and 18, an operation between one request handler and the cache register file is illustrated, and an operation of transferring one address and one data corresponding thereto is illustrated.

In a method of operating a multi-port queueing cache of FIG. 18, steps S100 and S800 may be substantially similar to steps S100 and S800 in FIG. 8, respectively. Steps S200a, S300a, S400a, S500a, S600a and S700a may be substantially similar to steps S200, S300, S400, S500, S600 and S700 in FIG. 8, respectively, except that a performer or operator who performs each step is changed from the cache bank to the cache register file.

Referring to FIGS. 15 and 19, operations between the plurality of request handlers and the cache register file are illustrated, and operations of transferring the plurality of addresses and the plurality of data corresponding thereto are illustrated.

In a method of operating a multi-port queueing cache of FIG. 19, steps S1100 and S1800 may be substantially similar to steps S1100 and S1800 in FIG. 13, respectively. Steps S1200a, S1300a and S1600a may be substantially similar to steps S1200, S1300 and S1600 in FIG. 13, respectively, except that a performer or operator who performs each step is changed from the cache bank to the cache register file.

When the cache bank-based multi-port queueing cache described with reference to FIGS. 2 through 14 is implemented, the capacity of the queueing cache may be increased, however, the performance of the queueing cache may be degraded when the data processing device accesses the same address through multiple ports simultaneously. For example, the cache bank may only perform one access at one time and may not perform more than one access at the same time. Thus, when several accesses are concentrated into one cache bank, the cache bank should sequentially perform the several accesses one by one, so the performance degradation may occur.

In the example of the multi-port queueing cache 300c of FIG. 15, a cache register file-based multi-port queueing cache may be implemented by dividing the inside of the queueing cache into two modules: the request handlers and the cache register file. Unlike the cache bank, the cache register file may implement the data storage part with the flip-flops, rather than the SRAM, and thus the cache register file may simultaneously perform several accesses. That is, multiple reserve interfaces and multiple request interfaces may access the same cache line at the same time.

Figure 20:
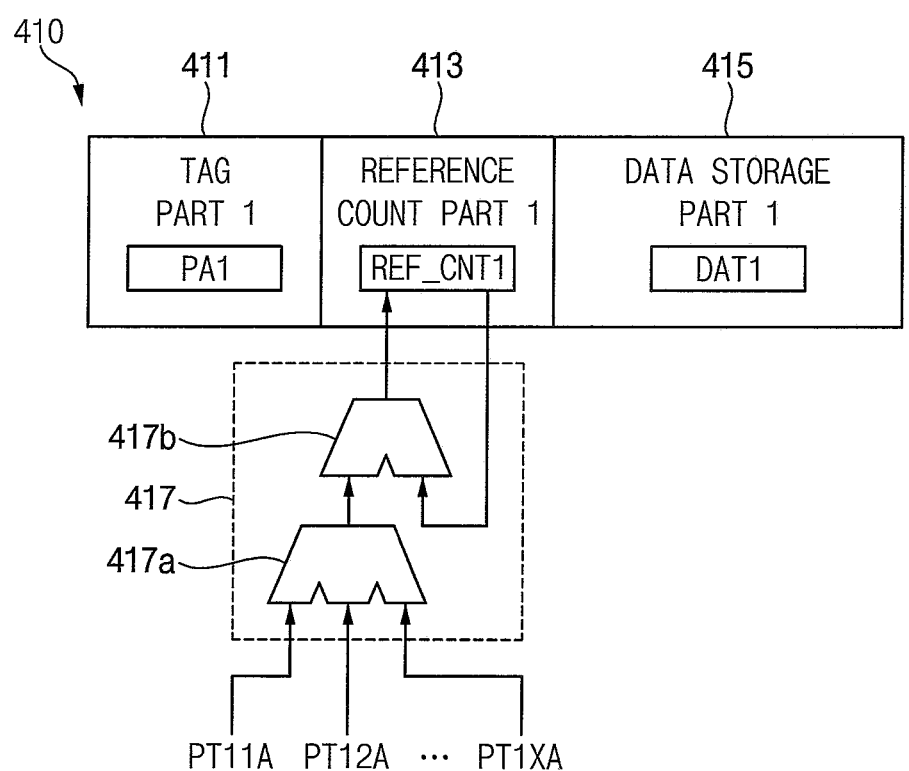
FIG. 20 is a diagram illustrating an example of a cache line included in a multi-port queueing cache according to example embodiments.

FIG. 20 is a diagram illustrating an example of a cache line included in a multi-port queueing cache according to example embodiments. The descriptions repeated with FIGS. 3, 4, 5, 16 and 17 are omitted for the sake of brevity.

Referring to FIG. 20, a first cache line 410 may include a first tag part 411, a first reference count part 413 and a first data storage part 415. The first cache line 410 may further include a first update part 417.

In some example embodiments, the first cache line 410, the first tag part 411, the first reference count part 413 and the first data storage part 415 may be the first cache line 410a, the first tag part 411a, the first reference count part 413a and the first data storage part 415a, which are described with reference to FIGS. 3, 4 and 5. In other example embodiments, the first cache line 410, the first tag part 411, the first reference count part 413 and the first data storage part 415 may be the first cache line 410b, the first tag part 411b, the first reference count part 413b and the first data storage part 415b, which are described with reference to FIGS. 16 and 17.

The first update part 417 may update the first reference count value REF_CNT1 based on the first reference count value REF_CNT1, which is stored in the first reference count part 413, and based on inputs PT11A, PT12A, . . . , PT1XA from the plurality of first ports PT11 to PT1X. The first update part 417 may store the updated first reference count value REF_CNT1 into the first reference count part 413. For example, the inputs PT11A to PT1XA from the plurality of first ports PT11 to PT1X may represent or indicate whether the plurality of first ports PT11 to PT1X are to be access the first cache line 410. For example, when the first port PT11 is to be access the first cache line 410, the input PT11A may have a value of one. For example, when the first port PT11 is not to be access the first cache line 410, the input PT11A may have a value of zero.

The first update part 417 may include adders 417a and 417b. The adder 417a may add the inputs PT11A to PT1XA from the plurality of first ports PT11 to PT1X. The adder 417b may generate the updated first reference count value REF_CNT1 by adding the first reference count value REF_CNT1 stored in the first reference count part 413 and an output of the adder 417a.

In the example of the cache line 410 of FIG. 20, even if the plurality of first ports PT11 to PT1X exist, only one reference count value may exist for each cache line. If each cache line includes reference count values the number of which is equal to the number of first ports, each reference count value should be increased whenever each cache line is accessed by each first port, and each cache line should include adders the number of which is equal to the number of first ports and the number of reference count values, so that the configuration of the cache line becomes complicated and the size of the cache line is increased. Alternatively or additionally, when each cache line includes one reference count value according to example embodiments, the number of accesses of the first ports may be summed when several first ports access each cache line, the reference count value may be increased at once, and each cache line may include only two adders regardless of the number of first ports, so that the configuration of the cache line becomes simplified and the size of the cache line is reduced.

Figure 21:
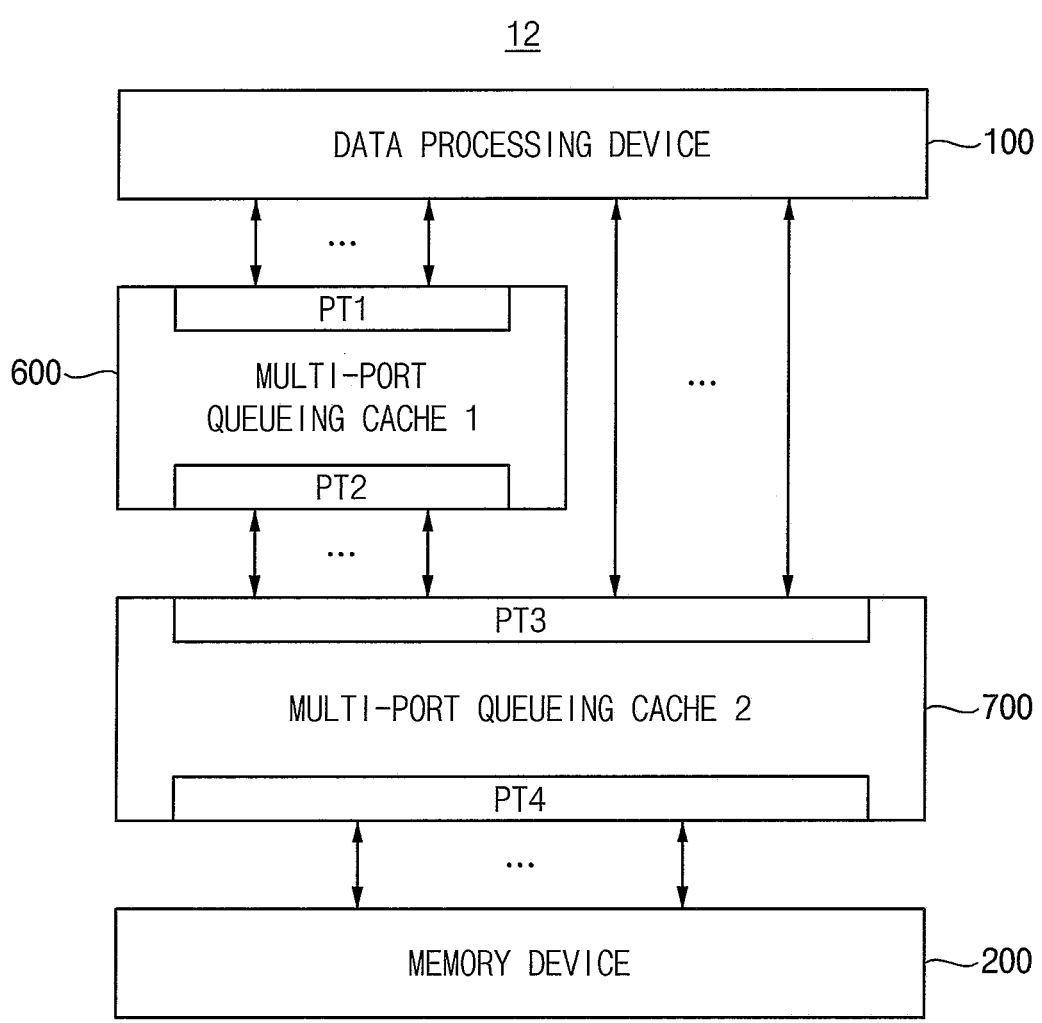
FIGS. 21, 22 and 23 are block diagrams illustrating a multi-port queueing cache and a data processing system including the multi-port queueing cache according to example embodiments.
Figure 22:
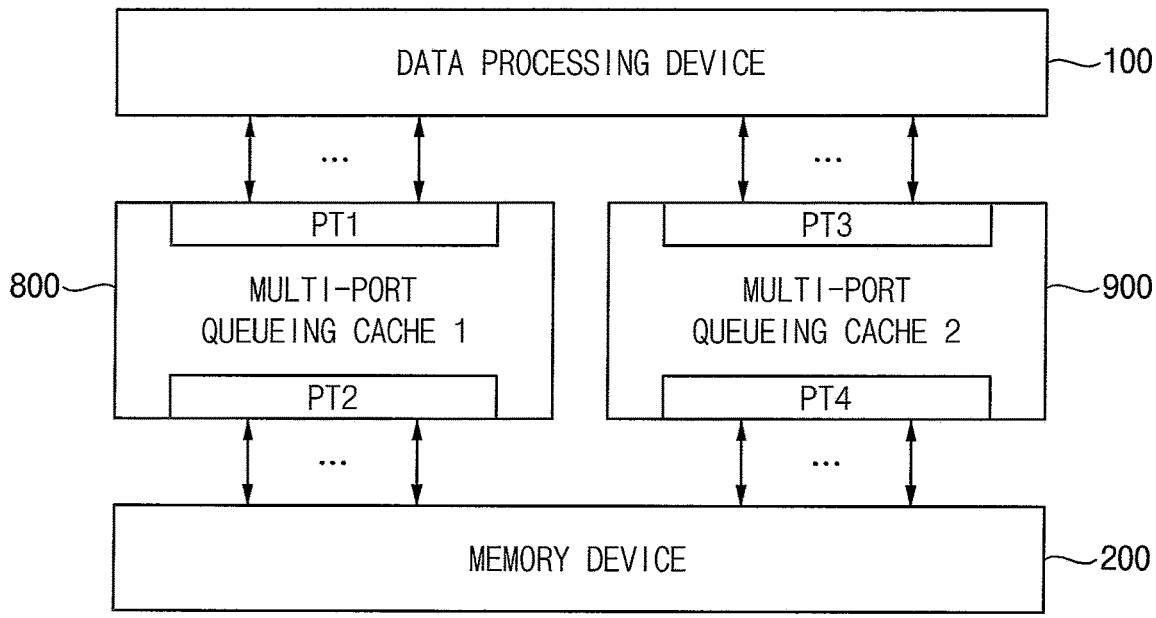
Figure 23:
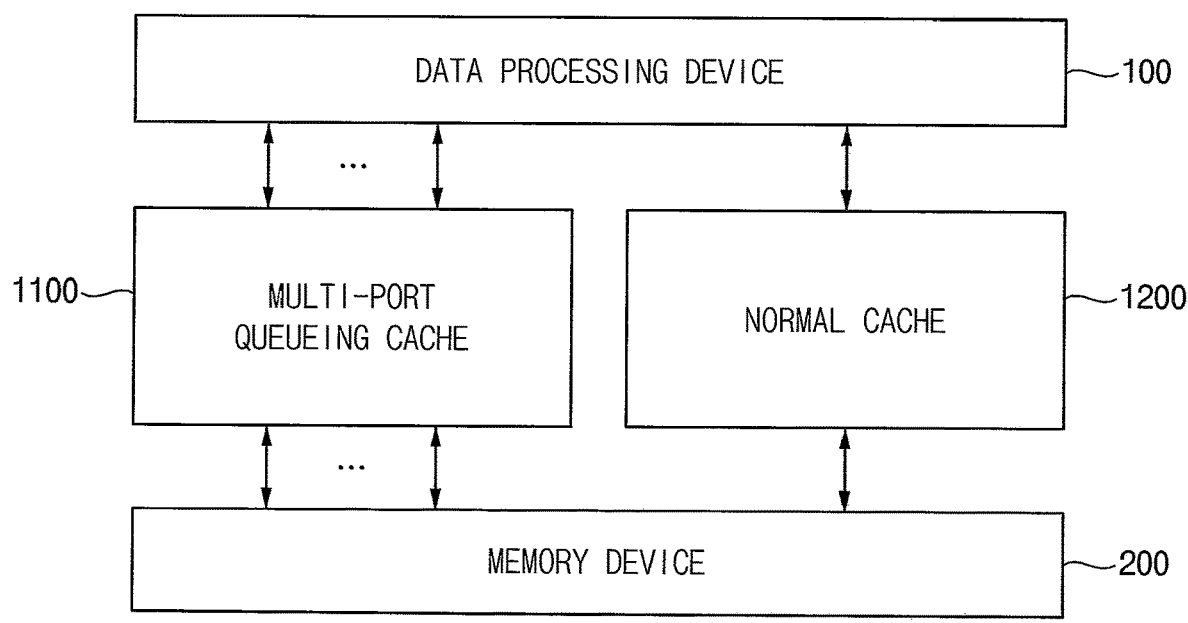

FIGS. 21, 22 and 23 are block diagrams illustrating a multi-port queueing cache and a data processing system including the multi-port queueing cache according to example embodiments. The descriptions repeated with FIG. 1 are omitted for the sake of brevity.

Referring to FIG. 21, a data processing system 12 includes a data processing device 100, a memory device 200, a first multi-port queueing cache 600 and a second multi-port queueing cache 700.

The data processing system 12 may be substantially similar to the data processing system 10 of FIG. 1, except that the data processing system 12 includes two multi-port queueing caches 600 and 700.

Each of the first multi-port queueing cache 600 and the second multi-port queueing cache 700 may be substantially similar to the multi-port queueing cache 300 in FIG. 1. The first multi-port queueing cache 600 may include a plurality of first ports PT1 and a plurality of second ports PT2, and the second multi-port queueing cache 700 may include a plurality of third ports PT3 and a plurality of fourth ports PT4. Although not illustrated in detail, the first multi-port queueing cache 600 may include a plurality of first request handlers, a first cache storage, a first reserve interface and a first request interface, as described with reference to FIG. 1. Similarly, the second multi-port queueing cache 700 may include a plurality of second request handlers, a second cache storage, a second reserve interface and a second request interface.

As shown in FIG. 21, the plurality of first ports PT1 in the first multi-port queueing cache 600 may be directly connected to the data processing device 100, and the plurality of second ports PT2 in the first multi-port queueing cache 600 may be directly connected to some of the plurality of third ports PT3 in the second multi-port queueing cache 700. Others of the plurality of third ports PT3 in the second multi-port queueing cache 700 may be directly connected to the data processing device 100, and the plurality of fourth ports PT4 in the second multi-port queueing cache 700 may be directly connected to the memory device 200.

In some example embodiments, the first multi-port queueing cache 600 may be the cache register file-based multi-port queueing cache described with reference to FIGS. 15 through 19, and the second multi-port queueing cache 700 may be the cache bank-based multi-port queueing cache described with reference to FIGS. 2 through 14. In this example, simultaneous accesses to the same cache line may be performed, and the number of required ports may be reduced while maintaining the large capacity. For example, when the data processing device 100 simultaneously requests the same address through three first ports, the first multi-port queueing cache 600 (e.g., the cache register file-based multi-port queueing cache) may request the same address to the second multi-port queueing cache 700 (e.g., the cache bank-based multi-port queueing cache) only once, and thus the number of required ports may be reduced.

In the example of the data processing system 12 of FIG. 21, the cache register file-based multi-port queueing cache and the cache bank-based multi-port queueing cache may be combined, mixed or cascaded. Therefore, the simultaneous accesses to the same cache line may be performed, which is an advantage of the cache register file-based multi-port queueing cache. Additionally or alternatively, the multi-port queueing cache may have the large capacity, which is an advantage of the cache bank-based multi-port queueing cache.

Referring to FIG. 22, a data processing system 14 includes a data processing device 100, a memory device 200, a first multi-port queueing cache 800 and a second multi-port queueing cache 900.

The data processing system 14 may be substantially similar to the data processing system 10 of FIG. 1, except that the data processing system 14 includes two multi-port queueing caches 800 and 900.

Each of the first multi-port queueing cache 800 and the second multi-port queueing cache 900 may be substantially similar to the multi-port queueing cache 300 in FIG. 1. The first multi-port queueing cache 800 may include a plurality of first ports PT1 and a plurality of second ports PT2, and the second multi-port queueing cache 900 may include a plurality of third ports PT3 and a plurality of fourth ports PT4. Although not illustrated in detail, the first multi-port queueing cache 800 may include a plurality of first request handlers, a first cache storage, a first reserve interface and a first request interface, as described with reference to FIG. 1. Similarly, the second multi-port queueing cache 900 may include a plurality of second request handlers, a second cache storage, a second reserve interface and a second request interface.

As shown in FIG. 22, the plurality of first ports PT1 in the first multi-port queueing cache 800 may be directly connected to the data processing device 100, and the plurality of second ports PT2 in the first multi-port queueing cache 600 may be directly connected to the memory device 200. The plurality of third ports PT3 in the second multi-port queueing cache 900 may be directly connected to the data processing device 100, and the plurality of fourth ports PT4 in the second multi-port queueing cache 900 may be directly connected to the memory device 200.

In some example embodiments, both the first multi-port queueing cache 800 and the second multi-port queueing cache 900 may be the cache register file-based multi-port queueing caches described with reference to FIGS. 15 through 19. In other example embodiments, both the first multi-port queueing cache 800 and the second multi-port queueing cache 900 may be the cache bank-based multi-port queueing cache described with reference to FIGS. 2 through 14.

Although FIGS. 21 and 22 illustrate the examples where the data processing system includes two multi-port queueing caches, example embodiments are not limited thereto, and the data processing system may include three or more multi-port queueing caches.

Referring to FIG. 23, a data processing system 16 includes a data processing device 100, a memory device 200, a multi-port queueing cache 1100 and a normal cache 1200.

The data processing system 16 may be substantially similar to the data processing system 10 of FIG. 1, except that the data processing system 16 includes the normal cache 1200. The multi-port queueing cache 1100 may be substantially similar to the multi-port queueing cache 300 in FIG. 1. As with the multi-port queueing cache 1100, the normal cache 1200 may be disposed between the data processing device 100 and the memory device 200.

In some example embodiments, one of the multi-port queueing cache 1100 and the normal cache 1200 may be selectively used depending on a data processing scheme. For example, when the data processed by the data processing device 100 are arranged in the predictable order and the data are read from the memory device 200 in the predetermined order (e.g., the deterministic sequence), such as, when matrix calculations and/or convolution calculations are performed, the multi-port queueing cache 1100 may be used. For another example, when the data processed by the data processing device 100 are not arranged in the predictable order and the data are read from the memory device 200 randomly (e.g., in a non-deterministic sequence), such as, when other general calculations are performed, the normal cache 1200 may be used. Therefore, the data processing system optimized for each calculation may be implemented.

Although FIG. 23 illustrates the example where the data processing system includes one multi-port queueing caches and one normal cache, example embodiments are not limited thereto, and the number of multi-port queueing caches and the number of normal caches in the data processing system may be variously determined.

Figure 24:
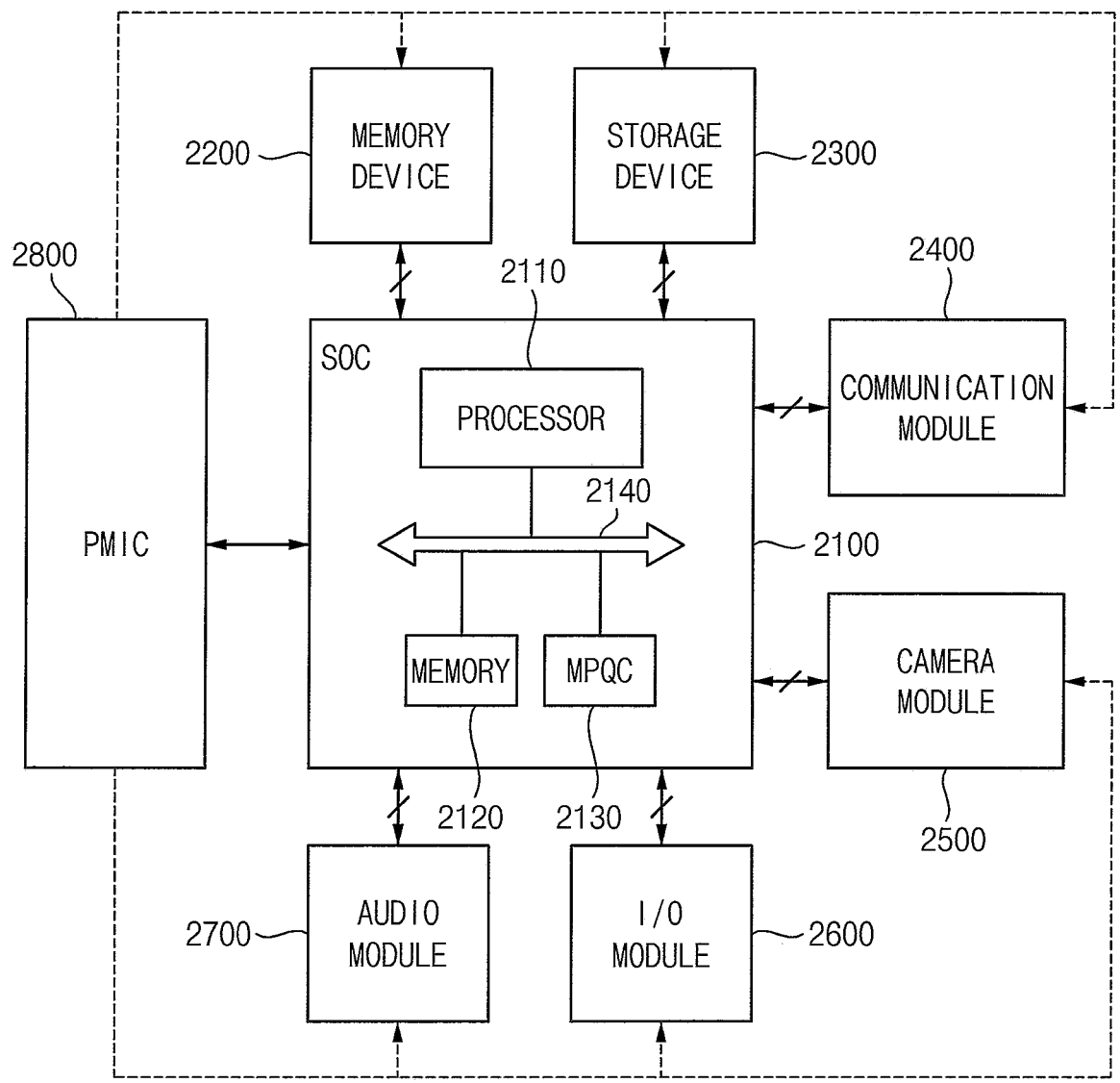
FIG. 24 is a block diagram illustrating an electronic device according to example embodiments.

FIG. 24 is a block diagram illustrating an electronic device according to example embodiments.

Referring to FIG. 24, an electronic device 2000 may include a system on chip (SOC) 2100, a memory device 2200, a storage device 2300, a plurality of functional modules 2400, 2500, 2600 and 2700, and a power management integrated circuit (PMIC) 2800.

The system on chip 2100 may control overall operations of the electronic device 2000. For example, the system on chip 2100 may control the memory device 2200, the storage device 2300 and the plurality of functional modules 2400, 2500, 2600 and 2700. For example, the system on chip 2100 may be an application processor (AP).

The system on chip 2100 may include a processor 2110, a memory 2120, a multi-port queueing cache (MPQC) 2130 and a system bus 2140. The system on chip 2100 may be the data processing system according to example embodiments, and may be implemented and may operate as described with reference to FIGS. 1 through 23. The processor 2110, the memory 2120 and the multi-port queueing cache 2130 may correspond to the data processing device 100, the memory device 200 and the multi-port queueing cache 300 in FIG. 1, respectively. In the multi-port queueing cache 2130, the queueing cache may be implemented with the multi-port structure for relatively large capacity and high performance, and thus the multi-access by the processor 2110 may be implemented. Accordingly, the plurality of data requests that are received from the processor 2110 may be individually and/or independently processed (or handled), and thus the efficient and optimized data reading and processing operations may be implemented.

The memory device 2200 and the storage device 2300 may store data for operations of the electronic device 2000. The memory device 2200 may include a volatile memory device, such as a dynamic random access memory (DRAM), a static random access memory (SRAM), a mobile DRAM, or the like. The storage device 2300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. In some example embodiments, the storage device 2300 may further include an embedded multimedia card (eMMC), a universal flash storage (UFS), a solid state drive (SSD), a hard disk drive (HDD), a CD-ROM, etc.

The functional modules 2400, 2500, 2600 and 2700 may perform various functions of the electronic device 2000. For example, the electronic device 2000 may include a communication module 2400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, or the like), a camera module 2500 that performs a camera function, an input-output (I/O) module 2600 including a display module that performs a display function and a touch panel module that performs a touch sensing function, and an audio module 2700 including a microphone (MIC) module, a speaker module, or the like, that performs input-output of audio signals. In some example embodiments, the electronic device 2000 may further include a global positioning system (GPS) module, a gyroscope module, or the like. However, the functional modules 2400, 2500, 2600 and 2700 in the electronic device 2000 are not limited thereto.

The power management integrated circuit 2800 may provide an operating voltage to the system on chip 2100, the memory device 2200, the storage device 2300 and the functional modules 2400, 2500, 2600 and 2700.

The inventive concept may be applied to various electronic devices and systems that include the caches and/or the cache memories. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A multi-port queueing cache, comprising:
    a plurality of first ports and a plurality of second ports;
    a plurality of request handlers respectively coupled to the plurality of first ports, the plurality of request handlers being configured to receive a plurality of addresses through the plurality of first ports, and to output a plurality of data corresponding to the plurality of addresses through the plurality of first ports;

a cache storage coupled to the plurality of second ports, the cache storage including a plurality of cache lines configured to store the plurality of data, the cache storage being configured to output at least a portion of the plurality of addresses through the plurality of second ports, and to receive at least a portion of the plurality of data corresponding to the at least a portion of the plurality of addresses through the plurality of second ports;

a reserve interface configured to exchange at least one address and at least one reserved cache line number; and a request interface configured to exchange the at least one reserved cache line number and at least one data, wherein the reserve interface and the request interface are disposed between each of the plurality of request handlers and the cache storage.

2. The multi-port queueing cache of claim 1, wherein the cache storage includes:
a plurality of cache banks coupled to the plurality of second ports, each of the plurality of cache banks including at least one of the plurality of cache lines.

3. The multi-port queueing cache of claim 2, wherein a first reserve interface and a first request interface are disposed between a first request handler of the plurality of request handlers and a first cache bank of the plurality of cache banks.

4. The multi-port queueing cache of claim 3, wherein:
the first request handler is configured to sequentially receive first to N-th addresses through a corresponding first port of the plurality of first ports, and to sequentially transfer the first to N-th addresses that are received through the corresponding first port to the first cache bank through the first reserve interface, where N is an integer greater than one, and in response to first data corresponding to the first address being not stored in the first cache bank, the first cache bank is configured to:
allocate the first address to a first cache line;
output the first address through a corresponding second port of the plurality of second ports;
transfer a cache line number of the first cache line to the first request handler through the first reserve interface;
receive the first data through the second port; and
store the first data received through the second port into the first cache line.

5. The multi-port queueing cache of claim 4, wherein:
the first request handler is configured to transfer the cache line number of the first cache line received through the first reserve interface to the first cache bank through the first request interface,
the first cache bank is configured to transfer the first data stored in the first cache line to the first request handler through the first request interface, and
the first request handler is configured to output the first data that is received through the first request interface through the first port.

6. The multi-port queueing cache of claim 5, wherein the first cache line includes:
a first tag part that includes a plurality of flip-flops and is configured to store a part of the first address;
a first reference count part includes another plurality of flip-flops and is configured to store a first reference count value; and a first data storage part that includes a static random access memory (SRAM) and is configured to store the first data.

7. The multi-port queueing cache of claim 6, wherein:
before the first address is allocated to the first cache line, the first reference count value is zero,
after the first address is allocated to the first cache line and before the cache line number of the first cache line is transferred to the first request handler, the first reference count value is increased, and
before the first data that is stored in the first cache line is transferred to the first request handler, the first reference count value is decreased.

8. The multi-port queueing cache of claim 6, wherein the first cache line includes:
a first update part configured to update the first reference count value based on the first reference count value that is stored in the first reference count part and inputs from the plurality of first ports.

9. The multi-port queueing cache of claim 4, wherein the first request handler includes:
a first request queue configured to queue the cache line number of the first cache line received through the first reserve interface, and to output the cache line number of the first cache line through the first request interface.

10. The multi-port queueing cache of claim 4, wherein, in response to second data corresponding to a second address being stored in the first cache bank, the first cache bank is configured to transfer a cache line number of a second cache line to which the second address is allocated and that stores the second data to the first request handler through the first reserve interface, without outputting the second address through the second port and without receiving the second data through the second port.

11. The multi-port queueing cache of claim 2, further comprising:
a reserve bus for the reserve interface between the plurality of request handlers and the plurality of cache banks; and
a request bus for the request interface between the plurality of request handlers and the plurality of cache banks.

12. The multi-port queueing cache of claim 1, wherein the cache storage includes:
a cache register file coupled to the plurality of second ports, the cache register file including the plurality of cache lines.

13. The multi-port queueing cache of claim 12, wherein each of the plurality of cache lines includes:
a tag part that includes a first plurality of flip-flops and is configured to store a part of one of the plurality of addresses;
a reference count part that includes a second plurality of flip-flops and is configured to store a reference count value; and
a data storage part that includes a third plurality of flip-flops and is configured to store one of the plurality of data.

14. A data processing system comprising:
a data processing device;
a memory device configured to store a plurality of data used for calculations performed by the data processing device; and
a first multi-port queueing cache between the data processing device and the memory device, wherein the first multi-port queueing cache includes:
a plurality of first ports and a plurality of second ports;
a plurality of first request handlers configured to receive a plurality of first addresses through the plurality of first ports, and to output a plurality of first data corresponding to the plurality of first addresses through the plurality of first ports;
a first cache storage including a plurality of first cache lines configured to store the plurality of first data, the first cache storage being configured to output at least a portion of the plurality of first addresses through the plurality of second ports, and to receive at least a portion of the plurality of first data corresponding to the at least a portion of the plurality of first addresses through the plurality of second ports;
a first reserve interface configured to exchange at least one address and at least one reserved cache line number; and
a first request interface configured to exchange the at least one reserved cache line number and at least one data,
wherein the first reserve interface and the first request interface are disposed between each of the plurality of first request handlers and the first cache storage.

15. The data processing system of claim 14, further comprising:
a second multi-port queueing cache between the data processing device and the memory device,
wherein the second multi-port queueing cache includes:
a plurality of third ports and a plurality of fourth ports;
a plurality of second request handlers configured to receive a plurality of second addresses through the plurality of third ports, and to output a plurality of second data corresponding to the plurality of second addresses through the plurality of third ports;
a second cache storage including a plurality of second cache lines configured to store the plurality of second data, the second cache storage being configured to output at least some of the plurality of second addresses through the plurality of fourth ports, and to receive at least some of the plurality of second data corresponding to the at least some of the plurality of second addresses through the plurality of fourth ports;
a second reserve interface configured to exchange at least one address and at least one reserved cache line number; and
a second request interface configured to exchange the at least one reserved cache line number and at least one data,
wherein the second reserve interface and the second request interface are disposed between each of the plurality of second request handlers and the second cache storage.

16. The data processing system of claim 15, wherein:
the plurality of first ports in the first multi-port queueing cache are directly connected to the data processing device,
the plurality of second ports in the first multi-port queueing cache are directly connected to a first portion of the plurality of third ports in the second multi-port queueing cache,
a second portion of the plurality of third ports in the second multi-port queueing cache are directly connected to the data processing device, and
the plurality of fourth ports in the second multi-port queueing cache are directly connected to the memory device.

17. The data processing system of claim 15, wherein:
the plurality of first ports in the first multi-port queueing cache and the plurality of third ports in the second multi-port queueing cache are directly connected to the data processing device, and
the plurality of second ports in the first multi-port queueing cache and the plurality of fourth ports in the second multi-port queueing cache are directly connected to the memory device.

18. The data processing system of claim 14, further comprising:
a normal cache between the data processing device and the memory device.

19. The data processing system of claim 14, wherein:
the data processing device comprises at least one of a neural processing unit (NPU), a graphic processing unit (GPU), and a digital signal processor (DSP), and
the memory device comprises a dynamic random access memory (DRAM).

20. A multi-port queueing cache comprising:
a plurality of first ports;
a plurality of request handlers respectively coupled to the plurality of first ports, the plurality of request handlers being configured to receive a plurality of addresses from a data processing device through the plurality of first ports, and to output a plurality of data corresponding to the plurality of addresses to the data processing device through the plurality of first ports, each of the plurality of request handlers including a first reserve port and a first request port, the data processing device being disposed outside the multi-port queueing cache;
a plurality of second ports;
a plurality of cache banks respectively coupled to the plurality of second ports, the plurality of cache banks including a plurality of cache lines configured to store the plurality of data, the plurality of cache banks being configured to output at least some of the plurality of addresses to a memory device through the plurality of second ports, and to receive at least some of the plurality of data corresponding to the at least some of the plurality of addresses from the memory device through the plurality of second ports, each of the plurality of cache banks including a second reserve port and a second request port, the memory device being disposed outside the multi-port queueing cache;
a reserve bus coupled to the first reserve port in each of the plurality of request handlers and the second reserve port in each of the plurality of cache banks; and
a request bus coupled to the first request port in each of the plurality of request handlers and the second request port in each of the plurality of cache banks,
wherein:
a first reserve interface and a first request interface are disposed between a first request handler of the plurality of request handlers and a first cache bank of the plurality of cache banks,
the first reserve interface includes the first reserve port, the second reserve port, and the reserve bus,
the first request interface includes the first request port, the second request port, and the request bus,
the first request handler is configured to sequentially receive first to N-th addresses from the data processing device through a corresponding first port of the plurality of first ports, and to sequentially transfer the first to N-th addresses to the first cache bank through the first reserve interface, where N is an integer greater than one, in response to first data corresponding to the first address being not stored in the first cache bank, the first cache bank is configured to allocate the first address to a first cache line, to output the first address to the memory device through a corresponding second port of the plurality of second ports, to transfer a cache line number of the first cache line to the first request handler through the first reserve interface, to receive the first data from the memory device through the second port, and to store the first data into the first cache line, the first request handler is configured to transfer the cache line number of the first cache line to the first cache bank through the first request interface, the first cache bank is configured to transfer the first data to the first request handler through the first request interface, and the first request handler is configured to output the first data to the data processing device through the first port.

* * * * *